US012593237B2

(12) United States Patent
Chen et al.

(10) Patent No.: US 12,593,237 B2
(45) **Date of Patent: \*Mar. 31, 2026**

(54) PHYSICAL LAYER PREAMBLE DESIGN FOR SPECIAL PACKET TYPES

(71) Applicant: QUALCOMM Incorporated, San Diego, CA (US)

(72) Inventors: Jialing Li Chen, San Diego, CA (US); Sameer Vermani, San Diego, CA (US); Bin Tian, San Diego, CA (US); Lin Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,197

(22) Filed: Sep. 7, 2023

(65) Prior Publication Data

US 2023/0422078 A1 Dec. 28, 2023

Related U.S. Application Data

(60) Continuation of application No. 18/304,310, filed on Apr. 20, 2023, now Pat. No. 12,096,267, which is a
(Continued)

(51) Int. Cl.
*H04W 28/06* (2009.01)
*H04W 28/02* (2009.01)

(52) U.S. Cl.
CPC ....... *H04W 28/0231* (2013.01); *H04W 28/06* (2013.01)

(58) Field of Classification Search
CPC .............. H04W 28/0231; H04W 28/06; H04L 5/0094; H04L 5/0048; H04L 5/0053; H04L 27/2603
See application file for complete search history.

(56) References Cited

U.S. PATENT DOCUMENTS 11,665,574 B2 5/2023 Chen et al.
2011/0305156 A1 12/2011 Liu et al.
(Continued)

FOREIGN PATENT DOCUMENTS

CN 106716861 A 5/2017
CN 107548538 A 1/2018
(Continued)

OTHER PUBLICATIONS

International Preliminary Report on Patentability—PCT/US2020/057239, The International Bureau of WIPO—Geneva, Switzerland, May 5, 2022.
(Continued)

*Primary Examiner* — Syed Ali
(74) *Attorney, Agent, or Firm* — Holland & Hart LLP

(57) ABSTRACT

This disclosure provides methods, devices and systems for generating packet preambles. Some implementations more specifically relate to preamble designs for special cases such as, for example, full-bandwidth multi-user multiple-input multiple-output (MU-MIMO), single-user (SU) preamble puncturing, hybrid automatic repeat request (HARQ), and multi-AP coordination. Multi-AP coordination may refer to coordinated beamforming (CoBF), joint transmission (JT), or coordinated orthogonal frequency division multiple access (C-OFDMA). Additionally, or alternatively, some implementations more specifically relate to preamble designs that accommodate signal fields of different cases.

19 Claims, 25 Drawing Sheets

100

Related U.S. Application Data division of application No. 17/078,890, filed on Oct. 23, 2020, now Pat. No. 11,665,574.

(60) Provisional application No. 63/028,519, filed on May 21, 2020, provisional application No. 62/954,260, filed on Dec. 27, 2019, provisional application No. 62/926,407, filed on Oct. 25, 2019.

(56) References Cited

U.S. PATENT DOCUMENTS

| | | | |
|---|---|---|---|
| 2013/0308713 A1 | 11/2013 | Zhang | |
| 2014/0036804 A1* | 2/2014 | Chen | H04L 5/0053 |
| | | | 370/329 |
| 2016/0329989 A1 | 11/2016 | Li et al. | |
| 2017/0288748 A1 | 10/2017 | Lou et al. | |
| 2018/0359066 A1 | 12/2018 | Mu et al. | |
| 2019/0141570 A1 | 5/2019 | Verma et al. | |
| 2019/0238301 A1 | 8/2019 | Verma et al. | |
| 2019/0364555 A1 | 11/2019 | Huang et al. | |
| 2021/0127291 A1 | 4/2021 | Chen et al. | |
| 2021/0204299 A1 | 7/2021 | Yun et al. | |
| 2021/0212035 A1* | 7/2021 | Son | H04W 72/121 |
| 2021/0250125 A1 | 8/2021 | Park et al. | |
| 2021/0320754 A1 | 10/2021 | Yun et al. | |
| 2021/0320830 A1 | 10/2021 | Park et al. | |
| 2021/0320831 A1 | 10/2021 | Park et al. | |
| 2021/0328741 A1 | 10/2021 | Jang et al. | |
| 2022/0104257 A1* | 3/2022 | Ryu | H04W 74/0866 |
| 2022/0150819 A1 | 5/2022 | Park et al. | |
| 2022/0159718 A1 | 5/2022 | Fang et al. | |
| 2022/0255693 A1 | 8/2022 | Lou et al. | |
| 2022/0272580 A1 | 8/2022 | Kim et al. | |
| 2022/0278775 A1 | 9/2022 | Huang et al. | |
| 2022/0278877 A1* | 9/2022 | Park | H04L 27/2603 |
| 2022/0286228 A1* | 9/2022 | Song | H04L 1/08 |
| 2022/0322348 A1* | 10/2022 | Park | H04B 7/0617 |
| 2022/0330087 A1* | 10/2022 | Lim | H04L 1/0061 |
| 2022/0345343 A1* | 10/2022 | Lim | H04L 5/0048 |
| 2022/0353120 A1 | 11/2022 | Park et al. | |
| 2022/0353847 A1 | 11/2022 | Kim et al. | |
| 2022/0377603 A1* | 11/2022 | Kim | H04W 28/06 |
| 2022/0417793 A1 | 12/2022 | Kim et al. | |
| 2023/0017257 A1* | 1/2023 | Park | H04L 5/001 |
| 2023/0022414 A1* | 1/2023 | Kim | H04W 28/0268 |
| 2023/0023486 A1* | 1/2023 | Lim | H04W 72/1273 |
| 2023/0024458 A1* | 1/2023 | Lim | H04L 5/0044 |
| 2023/0035527 A1* | 2/2023 | Huang | H04L 27/2613 |
| 2023/0337038 A1 | 10/2023 | Chen et al. | |
| 2025/0150319 A1* | 5/2025 | Park | H04L 27/2603 |

FOREIGN PATENT DOCUMENTS

| | | | |
|---|---|---|---|
| WO | 2021030233 A1 | 2/2021 | |
| WO | 2021030234 A2 | 2/2021 | |

OTHER PUBLICATIONS

International Search Report and Written Opinion—PCT/US2020/057239—ISA/EPO—Apr. 21, 2021.

Partial International Search Report—PCT/US2020/057239—ISA/EPO—Feb. 23, 2021.

Vermani S (Qualcomm)., et al., "Forward Compatibility for WiFi Preamble Design", IEEE Draft, 11-19-1519-00-00BE-Forward-Compatibility-for-WIFI-Preamble-Design, IEEE-SA Mentor, Piscataway, NJ USA, vol. 802.11 EHT, 802.11be, Sep. 15, 2019 (Sep. 15, 2019), pp. 1-14, XP068153673, Slide 6.

Vermani S (Qualcomm)., et al., "Forward Compatibility for WiFi Preamble Design", IEEE Draft, 11-19-1519-00-00BE-Forward-Compatibility-for-WIFI-Preamble-Design, IEEE-SA Mentor, Piscataway, NJ USA, vol. 802.11 EHT, 802.11be, Sep. 15, 2019 (Sep. 15, 2019), pp. 1-14, XP068153673.

* cited by examiner

601

OFDM 610    620                              t

SUBCARRIERS

CHANNEL
WIDTH f      630

602

OFDMA 650                t

CHANNEL
WIDTH

1700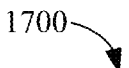

Receiving a packet including a physical layer preamble that includes a first portion and a second portion following the first portion, the first portion including an L-SIG, the second portion including an RL-SIG that immediately follows L-SIG and a universal signal field (U-SIG) that immediately follows RL-SIG and carries information for interpreting one or more subsequent fields of the second portion. (1702)

Determining a bandwidth of the packet based on the information carried in U-SIG. (1704)

Receiving the packet based on the determined bandwidth. (1706)

Determining a value of a compression field of U-SIG that is associated with the non-legacy signal field. (1712)

Determining a PPDU format of the packet based on the value of the compression field. (1714)

*Figure 17B*

1800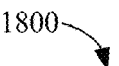

Receiving, via a wireless channel, a packet including a physical layer preamble that includes a first portion and a second portion following the first portion, the first portion including an L-SIG, the second portion including an RL-SIG that immediately follows L-SIG and a universal signal field (U-SIG) that immediately follows RL-SIG and carries information for interpreting one or more subsequent fields of the second portion. (1802)

Determining a PPDU format of the packet based on the information carried in U-SIG. (1804)

Determining one or more punctured subchannels of the wireless channel based on the PPDU format of the packet. (1806)

Receiving the packet based on the determined punctured subchannels. (1808)

*Figure 18A*

1810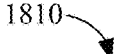

Determining a value of a compression field of U-SIG that is associated with the non-legacy signal field. (1812)

Determining that the wireless channel is punctured based on the value of the compression field. (1814)

Determining a value of an SU preamble puncturing field of U-SIG. (1822)

Determining that the wireless channel is punctured based on the value of the SU preamble puncturing field. (1824)

*Figure 18C*

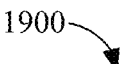

1900

Receiving, via a wireless channel, a packet including a physical layer preamble that includes a first portion and a second portion following the first portion, the first portion including an L-SIG, the second portion including an RL-SIG that immediately follows L-SIG and a universal signal field (U-SIG) that immediately follows RL-SIG and carries information for interpreting one or more subsequent fields of the second portion. (1902)

Identifying a PPDU format of the packet based on the information carried in U-SIG, the PPDU format being based on an MU PPDU format. (1904)

Receiving the packet based on the identified PPDU format. (1906)

*Figure 19A*

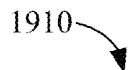

1910

Determining a value of a compression field of U-SIG that is associated with the non-legacy signal field. (1912)

Determining, based on the value of the compression field, whether the PPDU format is a first compression mode of the MU PPDU format, a second compression mode of the MU PPDU format, or the MU PPDU format without compression. (1914)

*Figure 19B*

PHYSICAL LAYER PREAMBLE DESIGN FOR SPECIAL PACKET TYPES

CROSS-REFERENCE TO RELATED APPLICATIONS

This application is a continuation of U.S. Divisional application Ser. No. 18/304,310, filed on Apr. 20, 2023, entitled "PHYSICAL LAYER PREAMBLE DESIGN FOR SPECIAL PACKET TYPES", is a divisional of U.S. application Ser. No. 17/078,890 filed on Oct. 23, 2020, entitled "PHYSICAL LAYER PREAMBLE DESIGN FOR SPECIAL PACKET TYPES" and, now U.S. Pat. No. 11,665, 574, issued May 30, 2023, which claims under 35 USC § 119 the benefit of and priority to U.S. Provisional Application No. 62/926,407 filed on Oct. 25, 2019, entitled "PHYSICAL LAYER PREAMBLE DESIGN FOR SPECIAL PACKET TYPES", to U.S. Provisional Patent Application No. 62/954,260 filed on Dec. 27, 2019, entitled "PHYSICAL LAYER PREAMBLE DESIGN FOR SPECIAL PACKET TYPES", and to U.S. Provisional Patent Application No. 63/028,519 and filed on May 21, 2020, entitled "PHYSICAL LAYER PREAMBLE DESIGN FOR SPECIAL PACKET TYPES", all of which are assigned to the assignee hereof. The disclosures of all prior Applications are considered part of and are incorporated by reference in this Patent Application.

TECHNICAL FIELD

This disclosure relates generally to wireless communication, and more specifically to physical layer preambles and signaling for wireless transmissions.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN. New WLAN communication protocols are being developed to enable enhanced WLAN communication features. As new WLAN communication protocols enable enhanced features, new preamble designs are needed to support signaling regarding the new features and packet formats.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by a wireless communication device, and may include receiving a packet including a physical layer preamble that includes a first portion and a second portion following the first portion, where the first portion includes a legacy signal field (L-SIG), and where the second portion includes a repeat of L-SIG (RL-SIG) that immediately follows L-SIG and a universal signal field (U-SIG) that immediately follows RL-SIG and carries information for interpreting one or more subsequent fields of the second portion; determining a bandwidth of the packet based on the information carried in U-SIG; and receiving the packet based on the determined bandwidth.

In some implementations, the one or more subsequent fields includes a non-legacy signal field following U-SIG, where the non-legacy signal field includes a common field and a user specific field consisting of one or more user fields. In some implementations, the method further includes determining a value of a compression field of U-SIG that is associated with the non-legacy signal field and determining a physical layer convergence protocol (PLCP) protocol data unit (PPDU) format of the packet based on the value of the compression field. In some implementations, the packet is determined to be formatted in accordance with a full-bandwidth multi-user multiple-input multiple-output (MU-MIMO) PPDU format based on the value of the compression field, where each of the user fields in the non-legacy signal field is formatted for a respective MU-MIMO allocation. In some implementations, resource unit (RU) allocation information is absent from the common field in the non-legacy signal field.

Another innovative aspect of the subject matter described in this disclosure can be implemented in a method for wireless communication. The method may be performed by a wireless communication device, and may include receiving, via a wireless channel, a packet including a physical layer preamble that includes a first portion and a second portion following the first portion, where the first portion includes an L-SIG, and where the second portion includes an RL-SIG that immediately follows L-SIG and a U-SIG that immediately follows RL-SIG and carries information for interpreting one or more subsequent fields of the second portion; determining a PPDU format of the packet based on the information carried in U-SIG; determining one or more punctured subchannels of the wireless channel based on the PPDU format of the packet; and receiving the packet based on the determined punctured subchannels.

In some implementations, the PPDU format is a multi-user (MU) PPDU format. In some implementations, the one or more subsequent fields includes a non-legacy signal field comprising a common field and a user specific field consisting of one or more user fields, where the common field includes RU allocation information for a single user. In some implementations, the one or more punctured subchannels are determined based on the RU allocation information. In some implementations, the non-legacy signal field consists of only one user field, where the one user field is for the single user. In some implementations, the method further includes determining a value of a compression field of U-SIG that is associated with the non-legacy signal field and determining that the wireless channel is punctured based on the value of the compression field. In some implementations, the method further includes determining a granularity of the RU allocation information based on a puncturing granularity of the one or more punctured subchannels. In some implementations, at least one of the punctured subchannels is determined based on a punctured channel indication bitmap included in U-SIG.

In some other implementations, the PPDU format is a single-user (SU) PPDU format. In some implementations, the method further includes determining a value of an SU preamble puncturing field of U-SIG and determining that the wireless channel is punctured based on the value of the SU preamble puncturing field. In some implementations, a bandwidth of the wireless channel is equal to 160 MHz, 240 MHz, or 320 MHz.

Another innovative aspect of the subject matter described in this disclosure can be implemented in a method for wireless communication. The method may be performed by a wireless communication device, and may include receiving, via a wireless channel, a packet including a physical layer preamble that includes a first portion and a second portion following the first portion, where the first portion includes an L-SIG, and where the second portion includes an RL-SIG that immediately follows L-SIG and a U-SIG that immediately follows RL-SIG and carries information for interpreting one or more subsequent fields of the second portion; identifying a PPDU format of the packet based on the information carried in U-SIG, where the PPDU format is based on an MU PPDU format; and receiving the packet based on the identified PPDU format.

In some implementations, the one or more subsequent fields includes a non-legacy signal field and the identifying of the PPDU format includes determining a value of a compression field of U-SIG that is associated with the non-legacy signal field and determining, based on the value of the compression field, whether the PPDU format is a first compression mode of the MU PPDU format, a second compression mode of the MU PPDU format, or the MU PPDU format without compression. In some implementations, the compression field includes one or more bits indicating whether the PPDU format is implemented with or without compression and the method further includes determining, based on a value of the one or more bits of the compression field, that the PPDU format is implemented with compression and determining whether the PPDU format is the first compression mode of the MU PPDU format or the second compression mode of the MU PPDU format based on information included in a bandwidth and punctured information field of U-SIG.

In some implementations, the receiving of the packet includes processing the packet as an orthogonal frequency-division multiple access (OFDMA) PPDU based on determining that the PPDU format is the MU PPDU format without compression. In some other implementations, the receiving of the packet includes processing the packet as a full-bandwidth MU MIMO PPDU based on determining that the PPDU format is the first compression mode of the MU-MIMO format.

In some other implementations, the receiving of the packet includes processing the packet as a full-bandwidth SU or MU MIMO PPDU based on determining that the PPDU format is the first compression mode of the MU-MIMO format. In some implementations, the processing of the packet includes determining that RU allocation information is absent from a common field of the non-legacy signal field. In some other implementations, the processing of the packet includes determining whether the packet is a full-bandwidth SU PPDU or a full-bandwidth MU-MIMO PPDU based on an integer value (n) included in a number of symbols of the non-legacy signal field or non-OFDMA users field of U-SIG. Still further, in some implementations, the processing of the packet includes determining that a user specific field of the non-legacy signal field consists of a single user field based on determining that the packet is a full-bandwidth SU PPDU and determining that the user specific field of the non-legacy signal field includes multiple user fields based on determining that the packet is a full-bandwidth MU-MIMO PPDU.

In some other implementations, the receiving of the packet includes processing the packet as a punctured SU or MU-MIMO PPDU based on determining that the PPDU format is the second compression mode of the MU-MIMO format. In some implementations, the processing of the packet includes determining that a common field of the non-legacy signal field includes a punctured channel table and identifying one or more punctured subchannels of the wireless channel based on the punctured channel table. In some other implementations, the processing of the packet includes determining whether the packet is a punctured SU PPDU or a punctured MU-MIMO PPDU based on an integer value (n) included in a number of symbols of the non-legacy signal field or non-OFDMA users field of U-SIG. Still further, in some implementations, the processing of the packet includes determining that a user specific field of the non-legacy signal field consists of a single user field based on determining that the packet is a punctured SU PPDU and determining that the user specific field of the non-legacy signal field includes multiple user fields based on determining that the packet is a punctured MU-MIMO PPDU.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a packet including a physical layer preamble that includes a first portion and a second portion following the first portion, where the first portion includes an L-SIG, and where the second portion includes an RL-SIG that immediately follows L-SIG and a U-SIG that immediately follows RL-SIG and carries information for interpreting one or more subsequent fields of the second portion; determining a bandwidth of the packet based on the information carried in U-SIG; and receiving the packet based on the determined bandwidth.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving, via a wireless channel, a packet including a physical layer preamble that includes a first portion and a second portion following the first portion, where the first portion includes an L-SIG, and where the second portion includes an RL-SIG that immediately follows L-SIG and a U-SIG that immediately follows RL-SIG and carries information for interpreting one or more subsequent fields of the second portion; determining a PPDU format of the packet based on the information carried in U-SIG; determining one or more punctured subchannels of the wireless channel based on the PPDU format of the packet; and receiving the packet based on the determined punctured subchannels.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving, via a wireless channel, a packet including a physical layer preamble that includes a first portion and a second portion following the first portion, where the first portion includes an L-SIG, and where the second portion includes an RL-SIG that immediately follows L-SIG and a U-SIG that immediately follows RL-SIG and carries information for interpreting one or more subsequent fields of the second portion; identifying a PPDU format of the packet based on the information carried in U-SIG, where the PPDU format is based on an MU PPDU format; and receiving the packet based on the identified PPDU format.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 12 shows an example frame structure of an Extremely High Throughput (EHT) PPDU allocated over multiple subchannels of a wireless channel according to some implementations.

FIG. 15A shows an example coordinated OFDMA (C-OFDMA) PPDU configuration usable for downlink (DL) communications between APs and STAs in a multi-AP group according to some implementations.

FIG. 15B shows another example C-OFDMA PPDU configuration usable for DL communications between APs and STAs in a multi-AP group according to some implementations.

FIG. 15C shows an example C-OFDMA PPDU configuration usable for uplink (UL) communications between APs and STAs in a multi-AP group according to some implementations.

FIG. 15D shows another example C-OFDMA PPDU configuration usable for UL communications between APs and STAs in a multi-AP group according to some implementations.

FIG. 17A shows a flowchart illustrating an example process for wireless communication that supports PHY preamble designs for special packet types according to some implementations.

FIG. 17B shows a flowchart illustrating an example process for wireless communication that supports PHY preamble designs for special packet types according to some implementations.

FIG. 18A shows a flowchart illustrating an example process for wireless communication that supports PHY preamble designs for special packet types according to some implementations FIG. 18B shows a flowchart illustrating an example process for wireless communication that supports PHY preamble designs for special packet types according to some implementations.

FIG. 18C shows a flowchart illustrating an example process for wireless communication that supports PHY preamble designs for special packet types according to some implementations.

FIG. 19A shows a flowchart illustrating an example process for wireless communication that supports PHY preamble designs for special packet types according to some implementations.

FIG. 19B shows a flowchart illustrating an example process for wireless communication that supports PHY preamble designs for special packet types according to some implementations.

Like reference numbers and designations in the various drawings indicate like elements.

DETAILED DESCRIPTION

Figure 1:
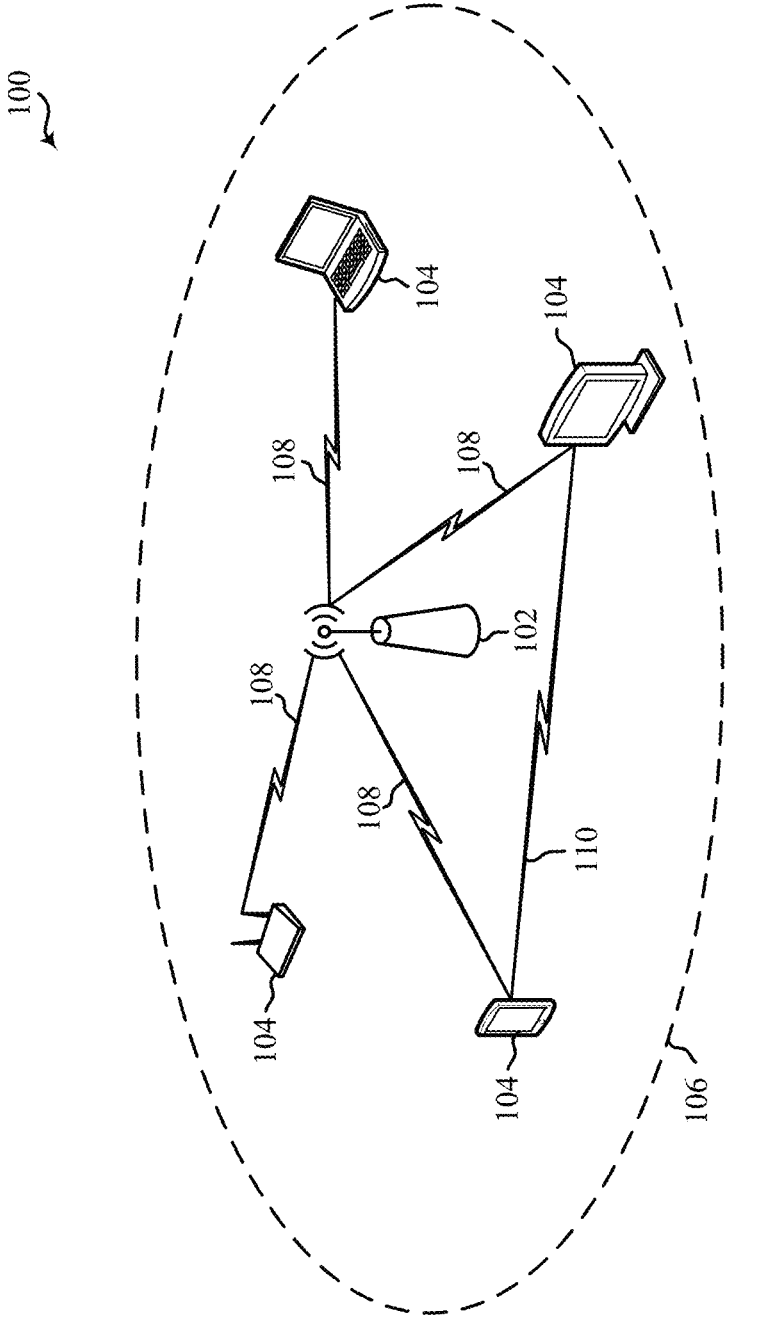
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

As described above, as new wireless communication protocols enable enhanced features, new preamble designs are needed to support signaling regarding the new features and packet formats. Various implementations relate generally to signaling included in a physical layer preamble that supports new wireless communication protocols. Some implementations more specifically relate to preamble designs for special cases such as, for example, full-bandwidth multi-user multiple-input multiple-output (MU-MIMO), single-user (SU) preamble puncturing, hybrid automatic repeat request (HARQ), and multi-AP coordination. Multi-AP coordination may refer to coordinated beamforming (CoBF), joint transmission (JT), or coordinated orthogonal frequency division multiple access (C-OFDMA). Additionally, or alternatively, some implementations more specifically relate to preamble designs that accommodate signal fields of different cases.

Signaling refers to control fields or information that can be used by a wireless communication device to interpret another field or portion of a packet. In some communication settings, such as using OFDMA, a wireless channel may utilize multiple subchannels that can be divided or grouped in a transmission to form different resource units (RUs). The signaling can indicate which RUs include data for a particular recipient. Other types of signaling include indicators regarding which subchannels include further signaling or which subchannels may be punctured. In accordance with various implementations of this disclosure, the signaling may be included in various portions of a physical layer preamble of a wireless transmission. In some implementations, the physical layer preamble may be used to indicate a bandwidth of the packet, puncturing of subchannels, HARQ information, or multi-AP communications. In some other implementations, the physical layer preamble may be used to indicate content channels that may carry further signaling.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
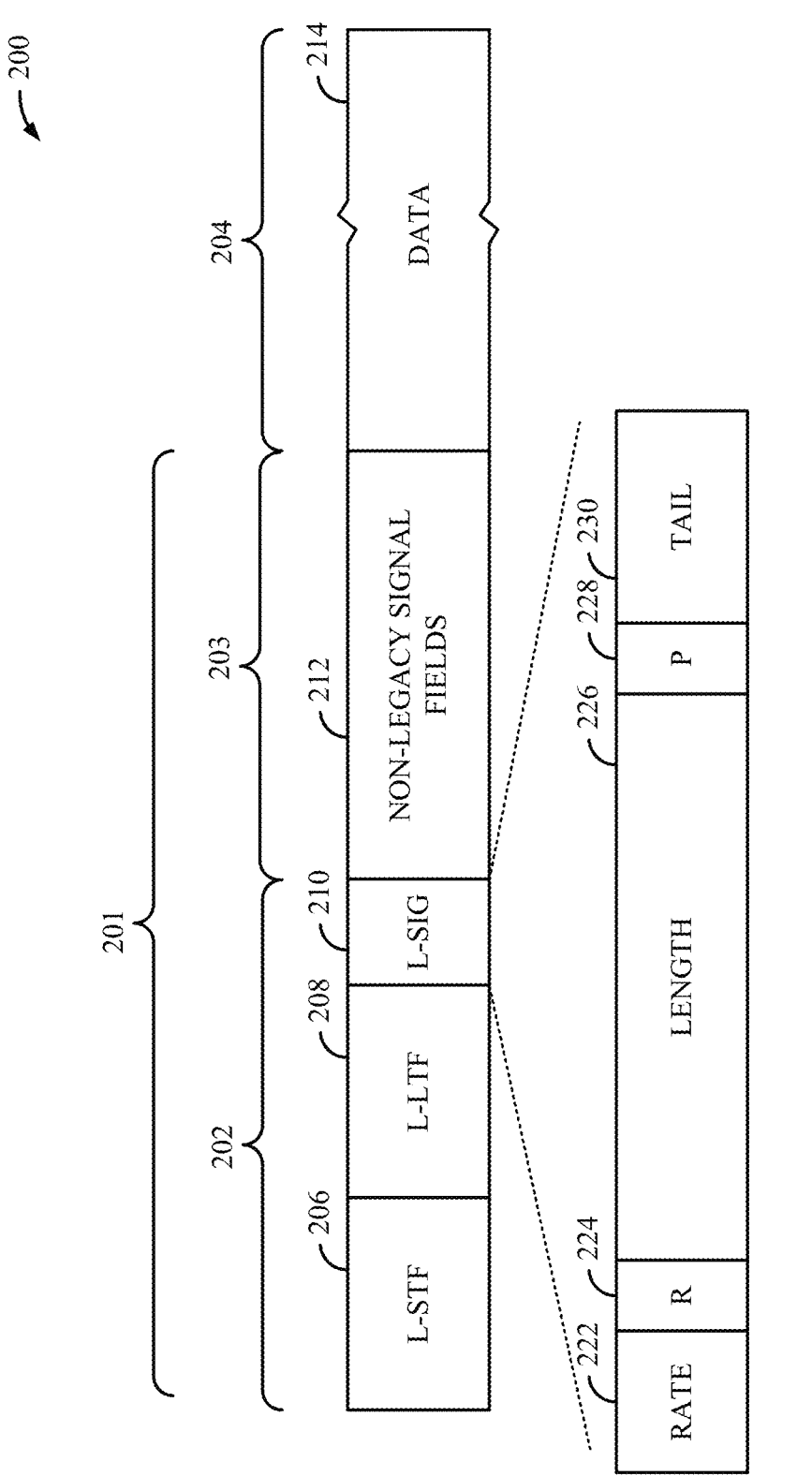
FIG. 2 shows an example protocol data unit (PDU) usable for communications between an access point (AP) and a number of stations (STAs).

FIG. 2 shows an example protocol data unit (PDU) 200 usable for wireless communication between an AP and a number of STAs. For example, the PDU 200 can be configured as a PPDU. As shown, the PDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard. The preamble 201 may also include a second portion 203 including one or more non-legacy signal fields 212, for example, conforming to an IEEE wireless communication protocol such as the IEEE 802.11ac, 802.11ax, 802.11be or later wireless communication protocol standards.

L-STF 206 generally enables a receiving device to perform automatic gain control (AGC) and coarse timing and frequency estimation. L-LTF 208 generally enables a receiving device to perform fine timing and frequency estimation and also to perform an initial estimate of the wireless channel. L-SIG 210 generally enables a receiving device to determine a duration of the PDU and to use the determined duration to avoid transmitting on top of the PDU. For example, L-STF 206, L-LTF 208 and L-SIG 210 may be modulated according to a binary phase shift keying (BPSK)

modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MP-DUs) or an aggregated MPDU (A-MPDU).

FIG. 2 also shows an example L-SIG 210 in the PDU 200. L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figures 3A, 3B:
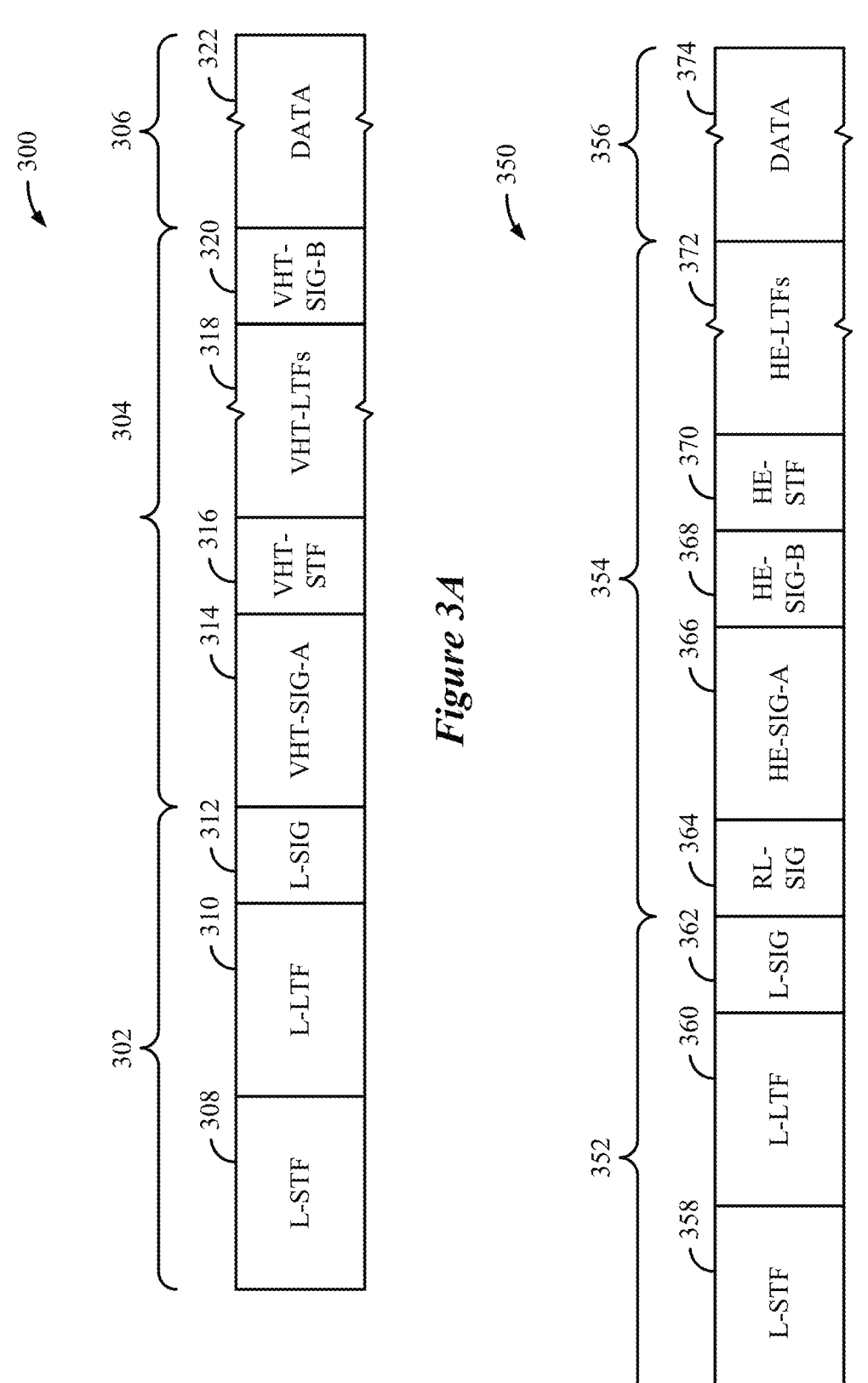
FIG. 3A shows an example PDU usable for communications between an AP and a number of STAs.
FIG. 3B shows another example PDU usable for communications between an AP and a number of STAs.

FIG. 3A shows another example PDU 300 usable for wireless communication between an AP and a number of STAs. The PDU 300 includes a PHY preamble including a first portion 302 and a second portion 304. The PDU 300 may further include a PHY payload 306 after the preamble, for example, in the form of a PSDU including a DATA field 322. The first portion 302 of the preamble includes L-STF 308, L-LTF 310, and L-SIG 312. The second portion 304 of the preamble and the DATA field 322 may be formatted as a Very High Throughput (VHT) preamble and frame, respectively, in accordance with the IEEE 802.11ac amendment to the IEEE 802.11 wireless communication protocol standard. The second portion 304 includes a first VHT signal field (VHT-SIG-A) 314, a VHT short training field (VHT-STF) 316, a number of VHT long training fields (VHT-LTFs) 318, and a second VHT signal field (VHT-SIG-B) 320 encoded separately from VHT-SIG-A 314. Like L-STF 308, L-LTF 310, and L-SIG 312, the information in VHT-SIG-A 314 may be duplicated and transmitted in each of the component 20 MHz subchannels in instances involving the use of a bonded channel.

VHT-STF 316 may be used to improve automatic gain control estimation in a MIMO transmission. VHT-LTFs 318 may be used for MIMO channel estimation and pilot subcarrier tracking. The preamble may include one VHT-LTF 318 for each spatial stream the preamble is transmitted on. VHT-SIG-A 314 may indicate to VHT-compatible APs 102 and STAs 104 that the PPDU is a VHT PPDU. VHT-SIG-A 314 includes signaling information and other information usable by STAs 104 to decode VHT-SIG-B 320. VHT-SIG-A 314 may indicate a bandwidth (BW) of the packet, the presence of space-time block coding (STBC), the number $N_{STS}$ of space-time streams per user, a Group ID indicating the group and user position assigned to a STA, a partial association identifier that may combine the AID and the BSSID, a short guard interval (GI) indication, a single-user/multi-user (SU/MU) coding indicating whether convolutional or LDPC coding is used, a modulation and coding scheme (MCS), an indication of whether a beamforming matrix has been applied to the transmission, a cyclic redundancy check (CRC) and a tail. VHT-SIG-B 320 may be used for MU transmissions and may contain the actual data rate and MPDU or A-MPDU length values for each of the multiple STAs 104, as well as signaling information usable by the STAs 104 to decode data received in the DATA field 322, including, for example, an MCS and beamforming information.

FIG. 3B shows another example PDU 350 usable for wireless communication between an AP and a number of STAs. The PDU 350 may be used for MU-OFDMA or MU-MIMO transmissions. The PDU 350 includes a PHY preamble including a first portion 352 and a second portion 354. The PDU 350 may further include a PHY payload 356 after the preamble, for example, in the form of a PSDU including a DATA field 374. The first portion 352 includes L-STF 358, L-LTF 360, and L-SIG 362. The second portion 354 of the preamble and the DATA field 374 may be formatted as a High Efficiency (HE) WLAN preamble and frame, respectively, in accordance with the IEEE 802.11ax amendment to the IEEE 802.11 wireless communication protocol standard. The second portion 354 includes a repeated legacy signal field (RL-SIG) 364, a first HE signal field (HE-SIG-A) 366, a second HE signal field (HE-SIG-B) 368 encoded separately from HE-SIG-A 366, an HE short training field (HE-STF) 370 and a number of HE long training fields (HE-LTFs) 372. Like L-STF 358, L-LTF 360, and L-SIG 362, the information in RL-SIG 364 and HE-SIG-A 366 may be duplicated and transmitted in each of the component 20 MHz subchannels in instances involving the use of a bonded channel. In contrast, HE-SIG-B 368 may be unique to each 20 MHz subchannel and may target specific STAs 104.

RL-SIG 364 may indicate to HE-compatible STAs 104 that the PPDU is an HE PPDU. An AP 102 may use HE-SIG-A 366 to identify and inform multiple STAs 104 that the AP has scheduled UL or DL resources for them. HE-SIG-A 366 may be decoded by each HE-compatible STA 104 served by the AP 102. HE-SIG-A 366 includes information usable by each identified STA 104 to decode an associated HE-SIG-B 368. For example, HE-SIG-A 366 may indicate the frame format, including locations and lengths of HE-SIG-Bs 368, available channel bandwidths, and modulation and coding schemes (MCSs), among other possibilities. HE-SIG-A 366 also may include HE WLAN signaling information usable by STAs 104 other than the number of identified STAs 104.

HE-SIG-B 368 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 368 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 374.

Figure 4:
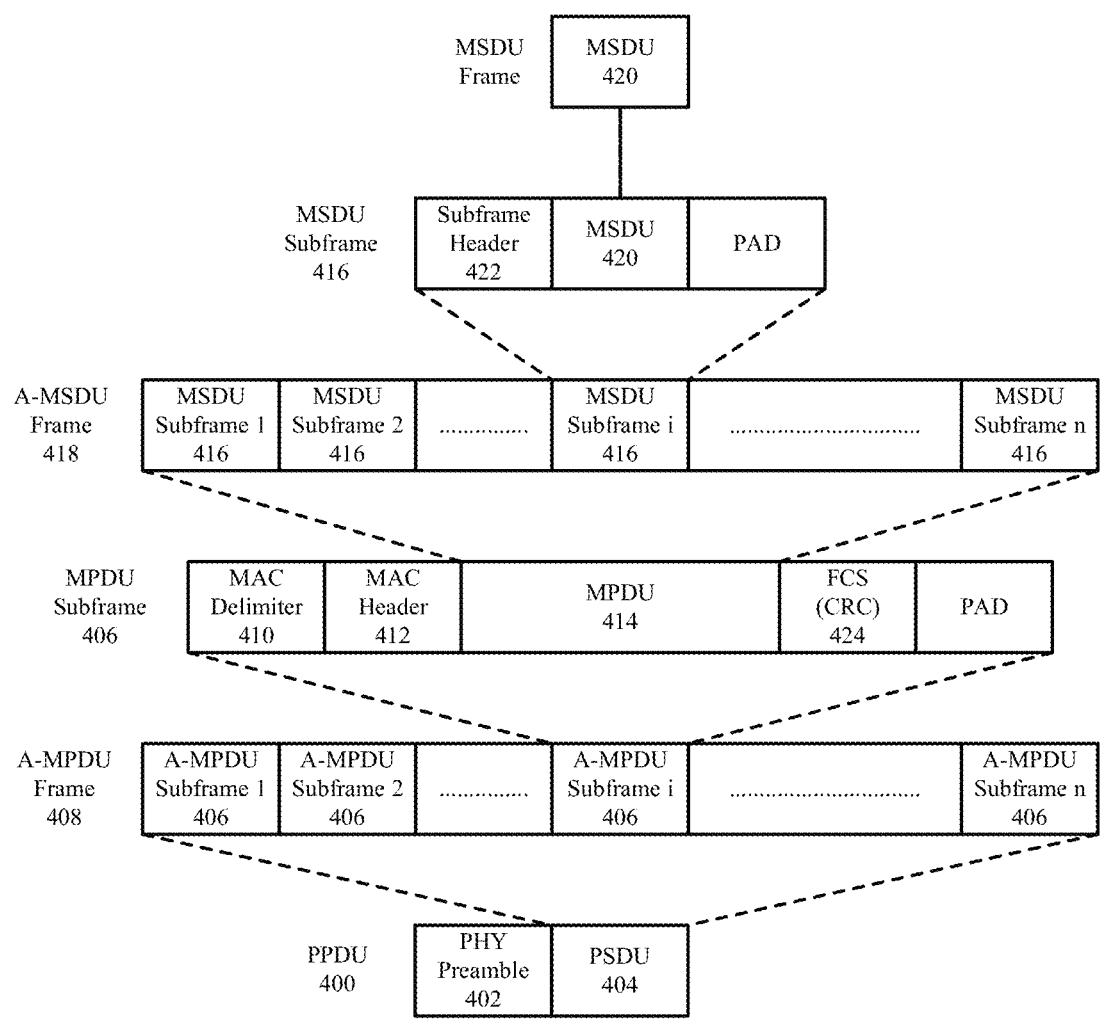
FIG. 4 shows an example physical (PHY) layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which comprises the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 may also include a frame check sequence (FCS) field 424 for error detection. For example, the FCS field 416 may include a cyclic redundancy check (CRC).

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
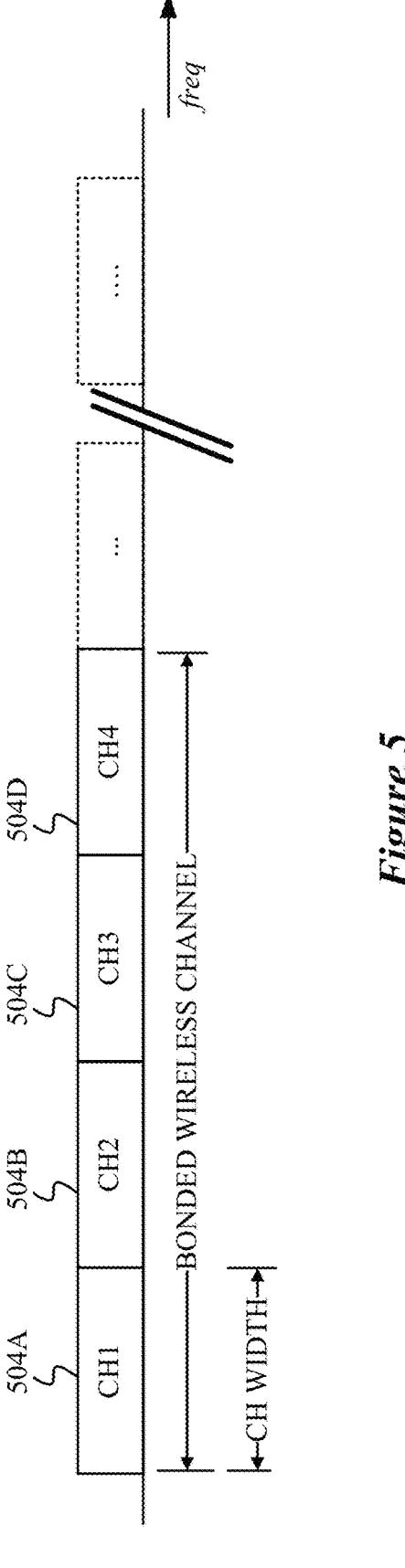
FIG. 5 shows an example bonded wireless channel that includes multiple subchannels.

FIG. 5 shows an example bonded wireless channel 500 that includes multiple subchannels. In FIG. 5, a channel map for a frequency band (such as the 2.5 GHz, 5 GHz or 6 GHz frequency bands) may define multiple channels 504. In the example of FIG. 5, each channel 504 has a uniform channel width W (such as 20 MHz, 40 MHz, or 80 MHz, among other examples). Some WLAN devices are capable of transmitting at higher bandwidths using a wireless channel that is made up of multiple channels (which may be referred to as subchannels when used as part of a larger wireless channel). In the example of FIG. 5, the wireless channel 500 may be used to transmit an 80 MHz transmission by bonding together a group of four subchannels 504 (a first subchannel 504A, a second subchannel 504B, a third subchannel 504C, and a fourth subchannel 504D). Although depicted as contiguous subchannels in the channel map, in some implementations, the wireless channel 500 may contain subchannels 504 which are not adjacent in the channel map. Additionally, larger groups of channels 504 may be used in some implementations. For example, IEEE 802.11ax provides for the use of 8 subchannels, and later versions of IEEE 802.11 may provide for the use of 16 (or more) subchannels for higher bandwidth transmissions.

Figure 6A:
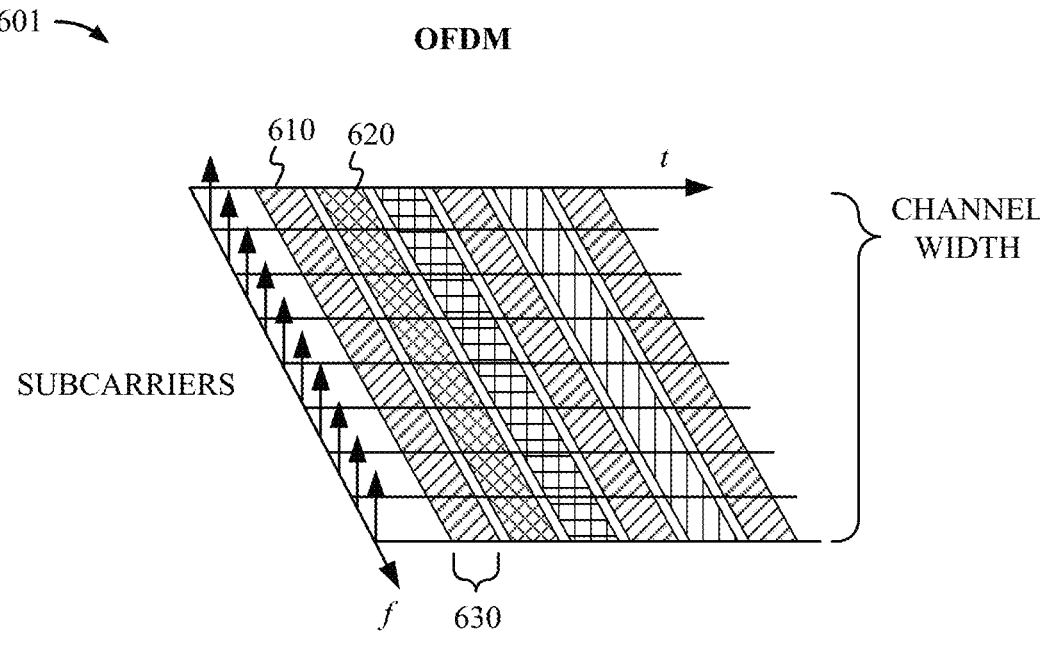
FIG. 6A shows a conceptual diagram of orthogonal frequency-division multiplexing (OFDM).

FIG. 6A shows a conceptual diagram of traditional OFDM 601. The OFDM channel width may include multiple subcarriers. A WLAN packet (also referred to as a PPDU) includes data that is encoded using the subcarriers of the channel width. For example, a first STA may transmit a first PPDU 610 during a first time period 530. During a second time period, a second STA may transmit a second PPDU 620. The time durations of the PPDUs 610 and 620 may be the same or different. Typically, the first STA and the second STA (and any other STAs in the BSS) will contend for access to the channel. Once the STA wins the contention, the STA can use the channel for transmission of a PPDU. As shown in FIG. 6A, the different shadings of the PPDUs indicate that different STAs may utilize the wireless channels sequentially, one at a time. However, this communication structure may be inefficient if a WLAN device does not have enough data to justify using the full channel bandwidth. The IEEE 802.11ax standard introduced the use of ODFMA in a WLAN.

Figure 6B:
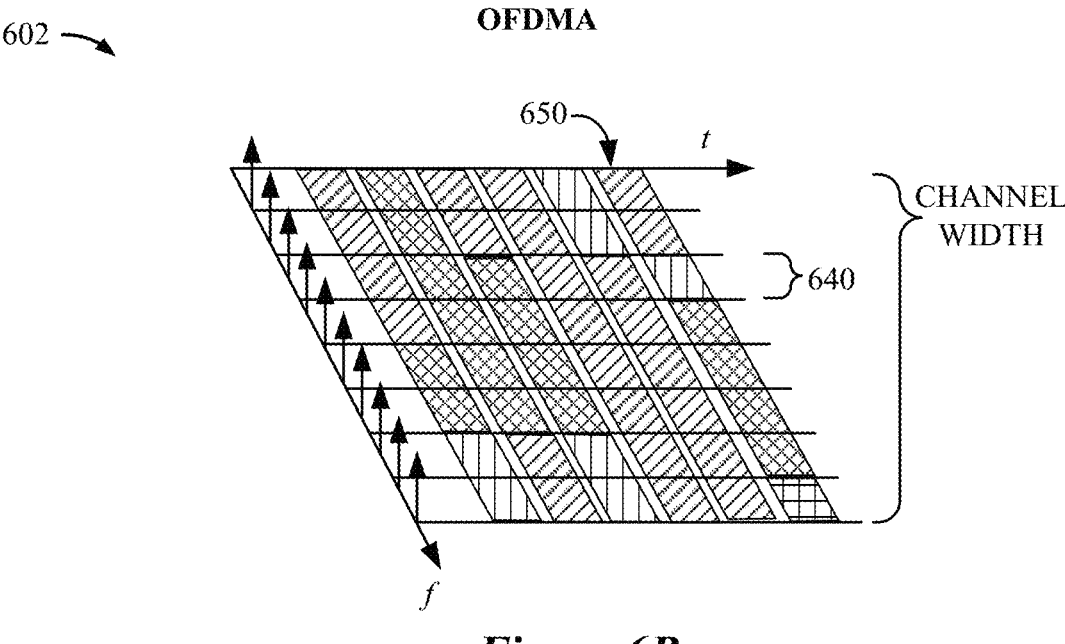
FIG. 6B shows a conceptual diagram of orthogonal frequency-division multiple access (OFDMA) illustrating resource assignments of a wireless channel.

FIG. 6B shows a conceptual diagram of OFDMA 602 illustrating resource assignments of a wireless channel. ODFMA breaks down the full channel width into a plurality of resource units (RUs). Each RU may include a different quantity of subcarriers. Using OFDMA, a first WLAN device (such as an AP) may allocate different RUs for different STAs. As shown in FIG. 6B, the different shadings indicate different RUs of PPDU that may be transmitted to (or allocated for the use by) different STAs. For example, a PPDU 650 may include different RUs allocated for a first STA, a second STA, a third STA, and a fourth STA. One RU 640 is allocated for a STA to transmit uplink data in the PPDU 650, while other RUs are allocated for different STAs. The allocation of RUs may be used for downlink transmissions or to schedule channel access.

Figure 7:
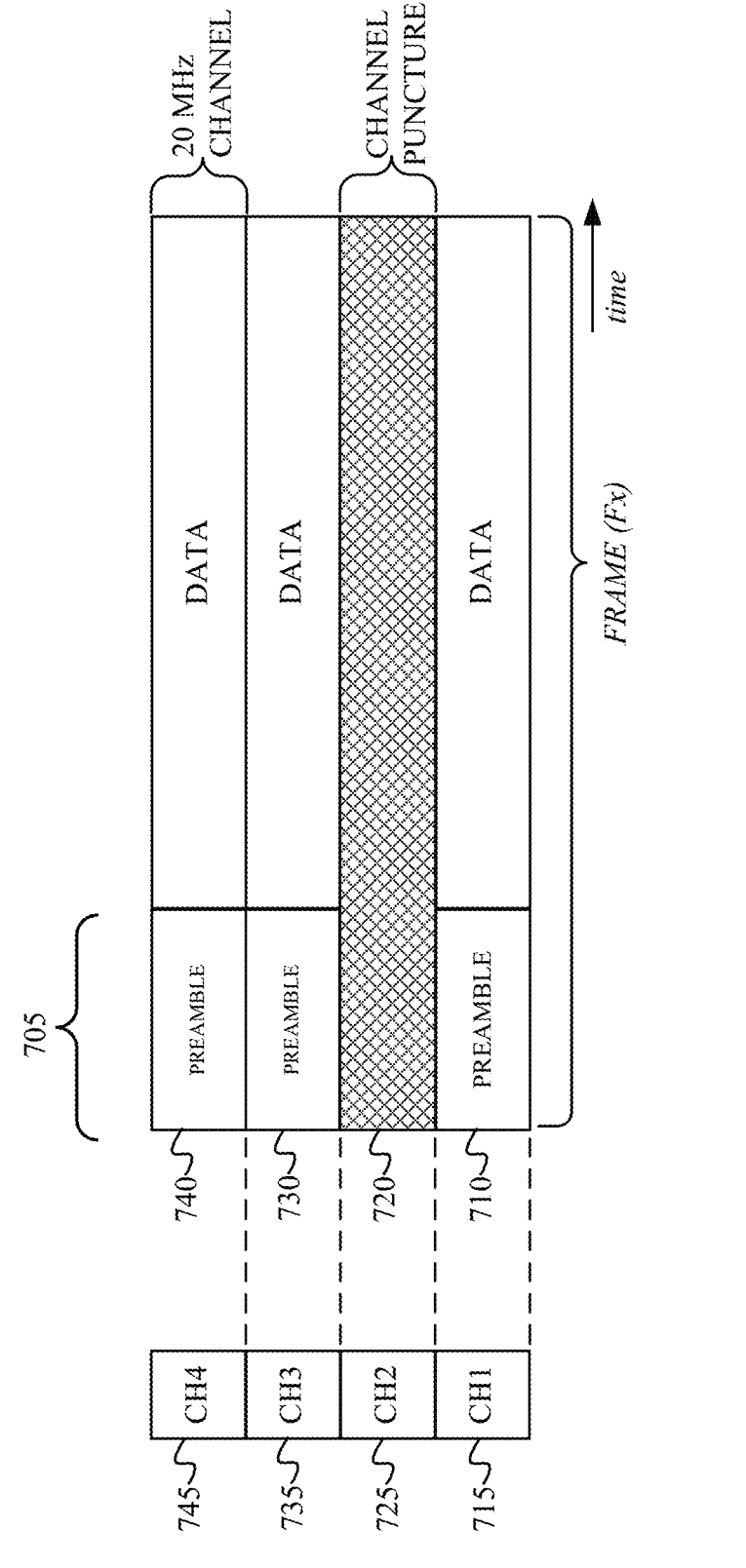
FIG. 7 depicts an example punctured transmission.

FIG. 7 depicts an example punctured transmission 700. In particular, FIG. 7 shows a conceptual time-based illustration of the transmissions that may be present on a first subchannel 715, a second subchannel 725, a third subchannel 735, and a fourth subchannel 745 of the wireless channel. For non-triggered transmissions, which are not prompted (or triggered) by a previous transmission, a WLAN device would perform a clear channel assessment (CCA, not shown) before sending the non-triggered transmission. The CCA is a type of collision avoidance technique. Other types may be referred to as carrier sense, carrier detect, listen-before-talk, among other examples. CCA is performed by a WLAN device to determine if the wireless communication medium (such as the group of subchannels) is available or busy (by another transmission). If the wireless communication medium is in use, the WLAN device may postpone transmission until the CCA is performed again and the wireless communication medium is not in use by another device.

In FIG. 7, there is an incumbent system transmission that occupies part of the second subchannel 725. Therefore, the wireless channel may be punctured to exclude the second subchannel 725 from the transmission. Thus, transmission 700 is sent only on the first sub channel 715, the third subchannel 735 and the fourth subchannel 745. The preamble 705 may include signaling 710, 730, and 740 on the non-punctured subchannels 715, 735, and 745, respectively. However, signaling may be omitted from the second subchannel 725.

Figure 8:
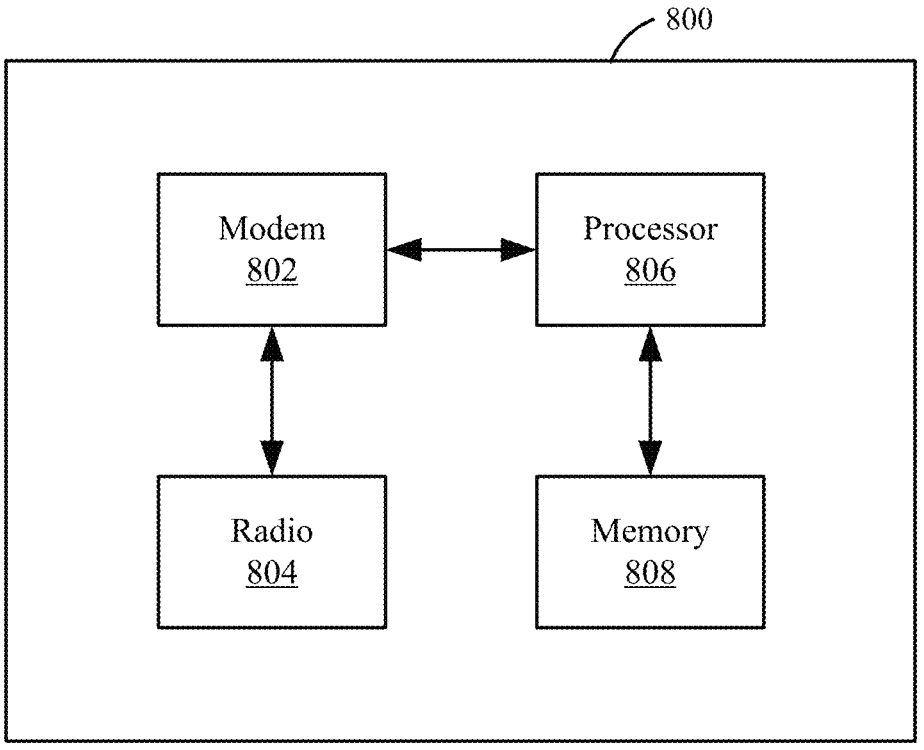
FIG. 8 shows a block diagram of an example wireless communication device.

FIG. 8 shows a block diagram of an example wireless communication device 800. In some implementations, the wireless communication device 800 can be an example of a device for use in a STA such as one of the STAs 104 described above with reference to FIG. 1. In some implementations, the wireless communication device 800 can be an example of a device for use in an AP such as the AP 102 described above with reference to FIG. 1. The wireless communication device 800 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 806 further includes one or more processors, processing blocks or processing elements 806 (collectively "the processor 806") and one or more memory blocks or elements 808 (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 806) for processing, evaluation or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 804 can include tangible storage media such as random-access memory (RAM) or read-only memory (ROM), or combinations thereof. The memory 804 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 9B:
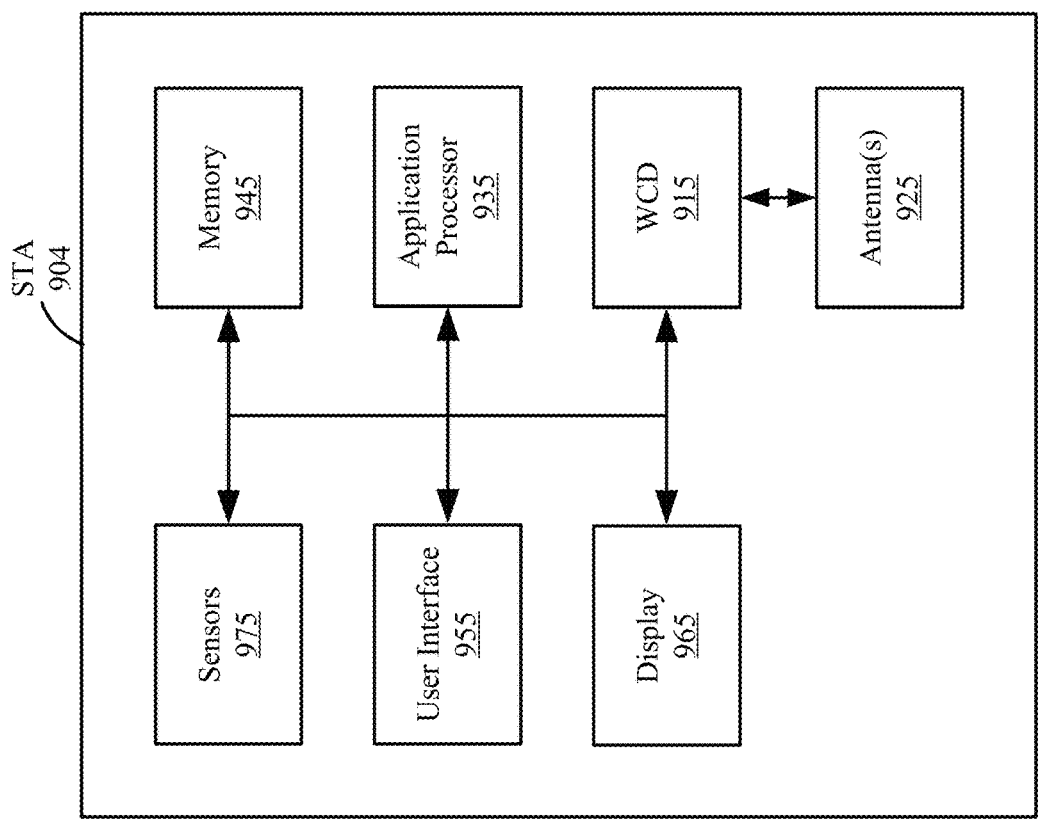
FIG. 9B shows a block diagram of an example STA.
Figure 9A:
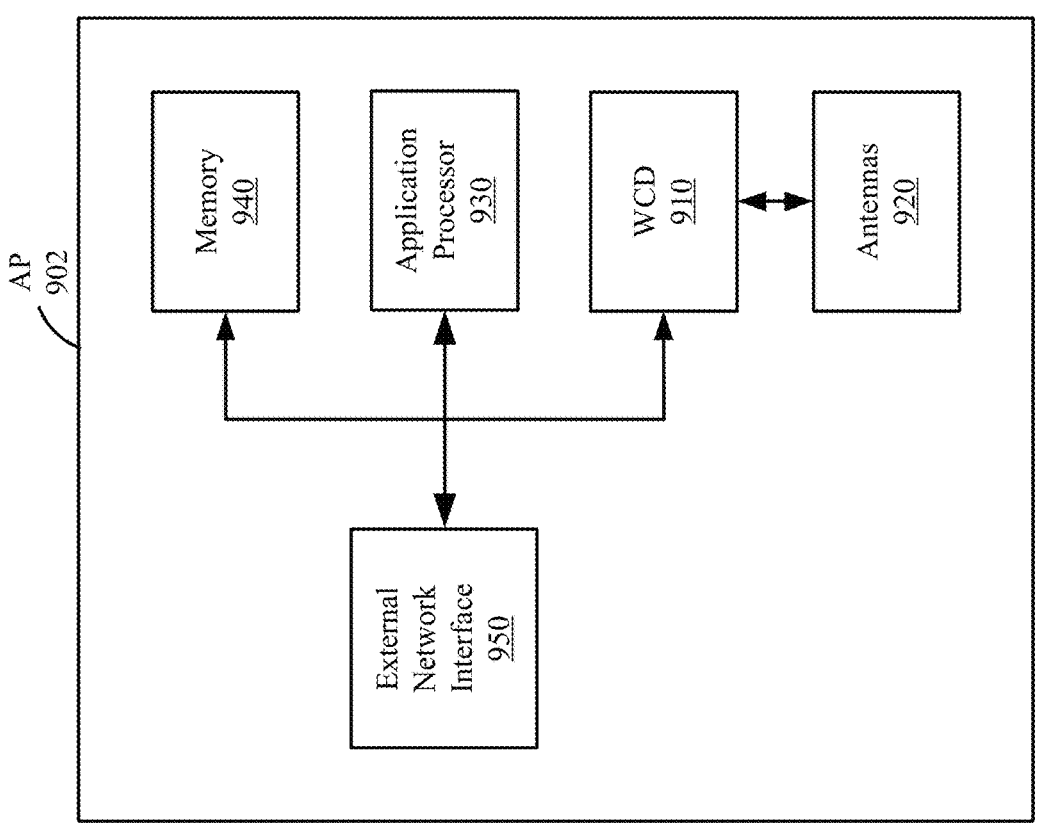
FIG. 9A shows a block diagram of an example AP.

FIG. 9A shows a block diagram of an example AP 902. For example, the AP 902 can be an example implementation of the AP 102 described with reference to FIG. 1. The AP 902 includes a wireless communication device (WCD) 910. For example, the wireless communication device 910 may be an example implementation of the wireless communication device 800 described with reference to FIG. 8. The AP 902 also includes multiple antennas 920 coupled with the wireless communication device 910 to transmit and receive wireless communications. In some implementations, the AP 902 additionally includes an application processor 930 coupled with the wireless communication device 910, and a memory 940 coupled with the application processor 930. The AP 902 further includes at least one external network interface 950 that enables the AP 902 to communicate with a core network or backhaul network to gain access to external networks including the Internet. For example, the external network interface 950 may include one or both of a wired (for example, Ethernet) network interface and a wireless network interface (such as a WWAN interface). Ones of the aforementioned components can communicate with other ones of the components directly or indirectly, over at least one bus. The AP 902 further includes a housing that encompasses the wireless communication device 910, the application processor 930, the memory 940, and at least portions of the antennas 920 and external network interface 950.

FIG. 9B shows a block diagram of an example STA 904. For example, the STA 904 can be an example implementation of the STA 104 described with reference to FIG. 1. The STA 904 includes a wireless communication device 915. For example, the wireless communication device 915 may be an example implementation of the wireless communication device 800 described with reference to FIG. 8. The STA 904 also includes one or more antennas 925 coupled with the wireless communication device 915 to transmit and receive wireless communications. The STA 904 additionally includes an application processor 935 coupled with the wireless communication device 915, and a memory 945 coupled with the application processor 935. In some implementations, the STA 904 further includes a user interface (UI) 955 (such as a touchscreen or keypad) and a display 965, which may be integrated with the UI 955 to form a touchscreen display. In some implementations, the STA 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The STA 904 further includes a housing that encompasses the wireless communication device 915, the application processor 935, the memory 945, and at least portions of the antennas 925, UI 955, and display 965.

As described above, as new wireless communication protocols enable enhanced features, new preamble designs are needed support signaling regarding features and resource allocations. Various implementations relate generally to signaling included in a physical layer preamble that supports new wireless communication protocols. Some implementations more specifically relate to preamble designs that do not significantly add to the preamble length. Additionally or alternatively, some implementations more specifically relate to preamble designs that accommodate signal fields of different types. Additionally or alternatively, some implementations more specifically relate to preamble designs that accommodate parallelization of signaling among different content channels, subchannels, or subbands (groups of subchannels) within a wireless channel.

Figure 10:
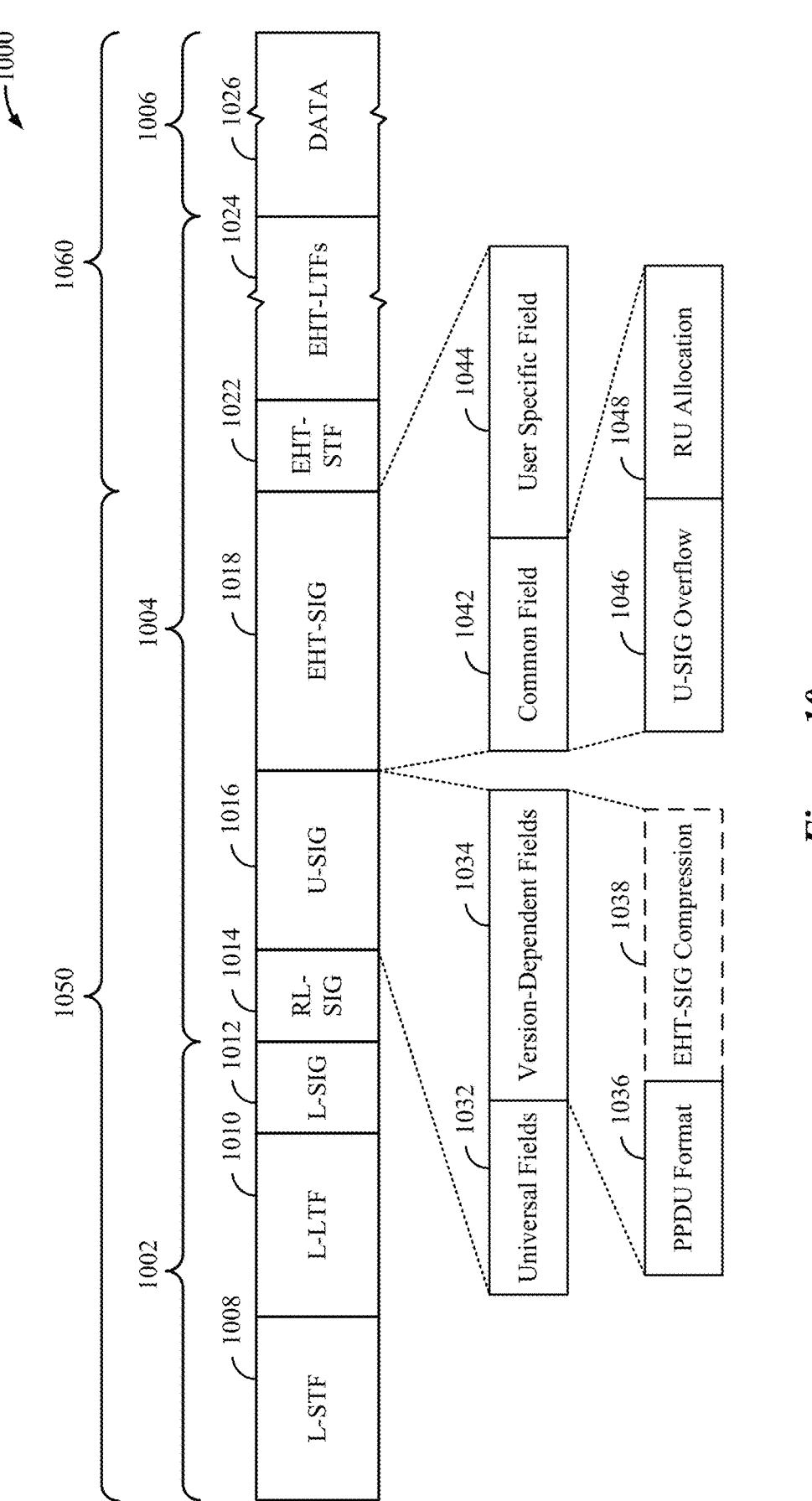
FIG. 10 shows an example PPDU usable for communications between an AP and a number of STAs according to some implementations.

FIG. 10 shows an example PPDU 1000 usable for wireless communication between an AP and a number of STAs according to some implementations. The PPDU 1000 may be used for SU, MU-OFDMA or MU-MIMO transmissions. The PPDU 1000 includes a PHY preamble including a legacy portion 1002 and a non-legacy portion 1004. The PPDU 1000 may further include a PHY payload 1006 after the preamble, for example, in the form of a PSDU including DATA field 1026. The legacy portion 1002 includes L-STF 1008, L-LTF 1010, and L-SIG 1012. The non-legacy portion 1004 of the preamble and DATA field 1026 may be formatted as an Extreme High Throughput (EHT) WLAN preamble and frame, respectively, in accordance with the IEEE 802.11be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol standard or other standard. As described later below, in some implementations, the PPDU 1000 also may be additionally logically partitioned into a pre-EHT portion 1050 (including PPDU fields 1008-1018) and an EHT portion 1060 (including PPDU fields 1022-1026).

The second portion 1004 of the preamble includes a repeated legacy signal field (RL-SIG) 1014 and multiple wireless communication protocol version-dependent signal fields after RL-SIG 1014. For example, the second portion may include a second signal field (referred to herein as "U-SIG") 1016, and a third signal field (referred to herein as "EHT-SIG") 1018. The second portion 1004 further includes an additional short training field (referred to herein as "EHT-STF") 1022 and a number of additional long training fields (referred to herein as "EHT-LTFs") 1024. Like L-STF 1008, L-LTF 1010, and L-SIG 1012, the information in RL-SIG 1014, U-SIG 1016 and EHT-SIG 1018 may be duplicated and transmitted in each of the component 20 MHz subchannels (which may include content channels) in instances involving the use of a bonded channel. In some implementations, EHT-SIG 1018 may carry different information on different content channels. For example, each content channel may include a group or subset of subchannels (or frequency segments) of a wireless channel on which the PPDU 1000 is transmitted.

In some implementations, U-SIG 1016 may include one or more universal fields 1032 and one or more version-dependent fields 1034. Information in the universal fields 1032 may include, for example, a version identifier (starting from the IEEE 802.11be amendment and beyond) and channel occupancy and coexistence information (such as a punctured channel indication). The version-dependent fields 1034 may include format information fields used for interpreting other fields of U-SIG and EHT-SIG and additional information fields or SU-specific fields that may be useful to intended recipients. In some implementations, the version-dependent fields 1034 may include at least a PPDU format field 1036. The PPDU format field 1036 may indicate a general PPDU format for the PPDU 1000 (such as a trigger-based (TB), a single-user (SU), or a multi-user (MU) PPDU format). In the MU PPDU format, there is an EHT-SIG compression field 1038. The EHT-SIG compression field 1038 may include one or more bits indicating a more specific or special case (such as full-bandwidth MU-MIMO).

In some implementations, EHT-SIG 1018 may include a common field 1042 and a user specific field 1044. The common field 1042 includes one or more bits or fields 1046 overflowed from U-SIG 1016 and RU allocation information 1048 for intended recipients of the PPDU 1000. In some implementations, the U-SIG overflow 1046 may be limited to 8 bits. The user specific field 1044 may include one or more user fields carrying per-user information for one or more intended recipients of the PPDU 1000. A user block field consists of up to two user fields plus a CRC and tail. In some implementations, each user field may be individually or separately encoded. Further, in some implementations, the RU allocation information 1048 and the user specific field 1044 may be absent from the SU PPDU format. Still further, in some implementations, EHT-SIG 1018 may be absent from the TB PPDU format.

As described previously, in IEEE 802.11be, and future generations, new fields may be used to carry signaling information. For example, the new fields and signaling information may be included in U-SIG 1016. Additionally, new fields and signaling information may be included in EHT-SIG 1018 (or may overflow from U-SIG 1016 into EHT-SIG 1018). In some implementations, U-SIG 1016 may include signaling regarding types or formats of additional signal fields (such as EHT-SIG 1018) that follow U-SIG 1016. EHT-SIG 1018 may be used by an AP to identify and inform multiple STAs 104 that the AP has scheduled UL or DL resources. EHT-SIG 1018 may be decoded by each compatible STA 104 served by the AP 102. EHT-SIG 1018 may generally be used by a receiving device to interpret bits in the DATA field 1026. In the context of DL MU-OFDMA, such information enables the respective STAs 104 to identify and decode corresponding RUs in the associated DATA field 1026.

In some implementations, the EHT-SIG 1018 contents are duplicated in every content channel. In some other implementations, a parallelization design for EHT-SIG 1018 may include spreading different fields into different content channels. For example, some fields may be transmitted in a specific 20 MHz subchannel of a first content channel, and different fields may be transmitted in a different 20 MHz subchannel of a second content channel. While the contents or values within the EHT-SIG may be different for different content channels, the format and field structures of the EHT-SIG may be consistent for all content channels.

In some implementations, the content channels include 20 MHZ subchannels in either the upper or the lower 160 MHz subbands of a 320 MHz wireless channel, and thus each content channel may carry RU allocation for either the upper or the lower 160 MHz subband, depending on the content channel location (such as depending on the [1,2,1,2] or [1,2,3,4] content channel structure). In other words, just as the 20 MHz subchannels are split into either upper or lower 160 MHz subbands of the entire bandwidth, the RU allocation for a 320 MHz channel or a 160+160 MHz channel may be split into two parts, including the upper and the lower 160 MHz subbands. The sizes of the subbands and quantities of divisions described are examples. Other divisions and sizes of subbands may be possible. For example, a channel may be split into three subbands of 80 MHz, 80 MHz, and 160 MHz bandwidths.

Figures 11A, 11B, 11C:
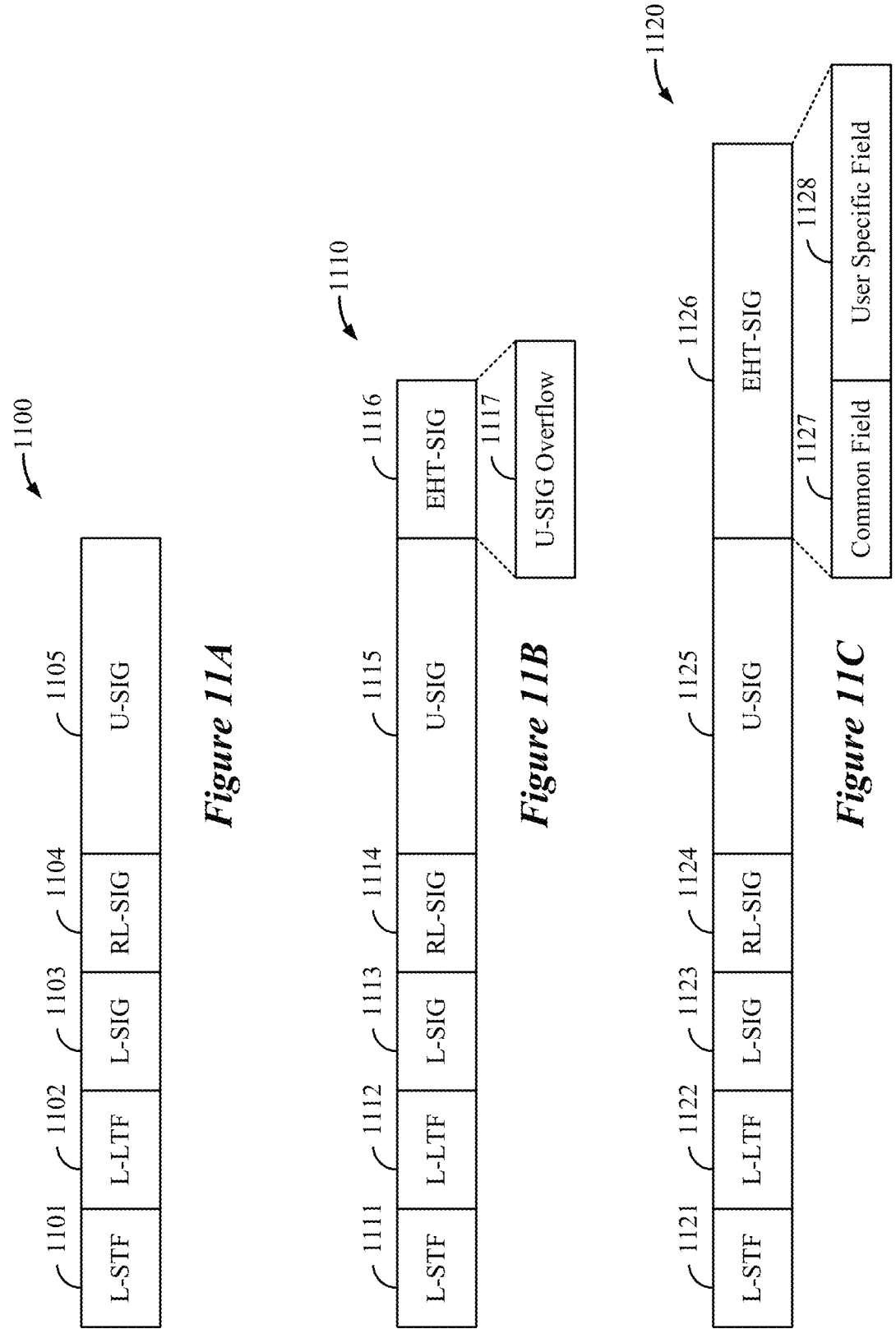
FIG. 11A shows an example frame structure for a trigger-based (TB) PPDU according to some implementations.
FIG. 11B shows an example frame structure for a single-user (SU) PPDU according to some implementations.
FIG. 11C shows an example frame structure for a multi-user (MU) PPDU according to some implementations.

FIG. 11A shows an example frame structure for a TB PPDU 1100 according to some implementations. The TB PPDU 1100 may be an example implementation of the PPDU 1000 of FIG. 10. For simplicity, only the pre-EHT portion of the TB PPDU 1100 (corresponding to the portion 1050 of PPDU 1000) is shown in FIG. 11A. The TB PPDU 1100 includes an L-STF 1101, an L-LTF 1102, an L-SIG 1103, an RL-SIG 1104, and a U-SIG 1105 which may correspond to L-STF 1008, L-LTF 1010, L-SIG 1012, RL-SIG 1014, and U-SIG 1016, respectively, of PPDU 1000. In the example TB PPDU format, the TB PPDU 1100 may not include an EHT-SIG. With reference for example to FIG. 10, the TB PPDU 1100 may not include any U-SIG overflow 1046, RU allocation information 1048, or other user-specific information (such as provided in the user specific field 1044).

FIG. 11B shows an example frame structure for an SU PPDU 1110 according to some implementations. The SU PPDU 1110 may be an example implementation of the PPDU 1000 of FIG. 10. For simplicity, only the pre-EHT portion of the SU PPDU 1110 (corresponding to the portion 1050 of PPDU 1000) is shown in FIG. 11B. The SU PPDU 1110 includes an L-STF 1111, an L-LTF 1112, an L-SIG 1113, an RL-SIG 1114, a U-SIG 1115, and an EHT-SIG 1116 which may correspond to L-STF 1008, L-LTF 1010, L-SIG 1012, RL-SIG 1014, U-SIG 1016, and EHT-SIG 1016, respectively, of PPDU 1000. In the example SU PPDU format, EHT-SIG 1116 may include only bits or fields 1117 overflowed from U-SIG 115. With reference for example to FIG. 10, the SU PPDU 1110 may not include any RU allocation information 1048, or other user-specific information (such as provided in the user specific field 1044). The EHT-SIG 1116 may be encoded as 1 symbol (using BPSK, rate ½ encoding) and have a fixed MCS.

In some implementations, the SU PPDU format of FIG. 11B may be used to indicate preamble puncturing for SU transmissions. For example, a (1-bit) SU preamble puncturing field may be added to U-SIG 1115 as one of the format info fields of the SU PPDU 1110. The SU preamble puncturing field may indicate the presence of preamble puncturing. Additionally, or alternatively, a new RU allocation format may be used in EHT-SIG 1116 to specify the punctured subchannels (or to specify which subchannels are not punctured). Punctured subchannels may have a granularity of 20 MHz. Accordingly, the new RU allocation format also may have a granularity of 20 MHz. As described in greater detail below, with respect to FIG. 12, the new RU allocation format may be based on a content channel structure. Thus, in some implementations, EHT-SIG 1116 of the SU PPDU 1110 may be signaled on a number of content channels.

FIG. 11C shows an example frame structure for a MU PPDU 1120 according to some implementations. The MU PPDU 1120 may be an example implementation of the PPDU 1000 of FIG. 10. For simplicity, only the pre-EHT portion of the MU PPDU 1120 (corresponding to the portion 1050 of PPDU 1000) is shown in FIG. 11C. The MU PPDU 1120 includes an L-STF 1121, an L-LTF 1122, an L-SIG 1123, an RL-SIG 1124, a U-SIG 1125, and an EHT-SIG 1126 which may correspond to L-STF 1008, L-LTF 1010, L-SIG 1012, RL-SIG 1014, U-SIG 1016, and EHT-SIG 1016, respectively, of PPDU 1000. In the example MU PPDU format, EHT-SIG 1126 may include a common field 1127 and a user specific field 1128. With reference for example to FIG. 10, the common field 1042 may further include U-SIG overflow 1046 and RU allocation information 1048. The user specific field 1128 may include per-user information for one or more intended recipients of the MU PPDU 1120.

In some implementations, a recipient of the MU PPDU 1120 (such as a STA) may determine a bandwidth of the packet based at least in part on information included in the U-SIG 1125 for interpreting one or more subsequent fields of the MU PPDU 1120. With reference for example to FIG. 10, the receiving device may determine that the MU PPDU 1120 is transmitted using full-bandwidth MU-MIMO based on a value in the EHT-SIG compression field 1038. More generally, the value of the EHT-SIG compression field 1038 may be used to indicate a specific or special PPDU format. For example, when the MU PPDU 1120 is transmitted using full-bandwidth MU-MIMO, the common field 1127 in EHT-SIG 1126 may consist of only the bits or fields overflowed from U-SIG 1125 (but no RU allocation information). Further, each user field in the user specific field 1128 may be formatted for a MU-MIMO allocation. In some implementations, the formatting of the user specific field 1128 may be different than a format for MU-MIMO allocation defined by existing or legacy IEEE 802.11 standards (such as IEEE 802.11ax).

As described above with respect to FIG. 7, a wireless channel may be punctured to exclude one or more subchannels from the transmission of a PPDU, including the signaling of the preamble, to avoid interference (such as from an incumbent system transmission) on the punctured subchannels. Because RUs are individually allocated in a MU PPDU, aspects of the present disclosure may use the MU PPDU format to indicate preamble puncturing for SU transmissions. In some implementations, an SU transmission may be performed using a MU PPDU 1120 without any special indication. For example, the RU allocation information in the common field 1127 of EHT-SIG 126 can be used to individually allocate RUs to the single user, thereby avoiding the punctured channels. In some other implementations, U-SIG 1125 may be used to indicate SU preamble puncturing. For example, the SU preamble puncturing may be indicated by a value of the EHT-SIG compression field in U-SIG 1125. Additionally, or alternatively, the user specific field 1128 in EHT-SIG 1126 may be reduced or optimized for a single user. Additionally, or alternatively, the common field 1127 in EHT-SIG 1126 may be reduced or optimized by using a new format for the RU allocation (in lieu of the RU allocation information 1048 described with respect to FIG. 10).

In some implementations, the MU PPDU format may be used for full-bandwidth SU and MU-MIMO communications. For example, a full-bandwidth SU frame format may be implemented as a "compression mode" of the MU PPDU format (in lieu of the SU PPDU format of FIG. 11B). More specifically, the full-bandwidth SU frame format may be implemented by compressing (reducing or eliminating) one or more fields or subfields of the MU PPDU 1120. In some aspects, a punctured SU frame format (to indicate SU preamble puncturing) may be implemented as another compression mode of the MU PPDU format. For example, the punctured SU frame format also may be implemented by compressing one or more fields or subfields of the MU PPDU 1120. The different compression modes may be implemented, at least in part, by compressing (or not compressing) the RU allocation information in the common field 1127. For example, the RU allocation information may be omitted in the full-bandwidth SU (or MU-MIMO) frame format. Additionally, or alternatively, the RU allocation information may be substituted for a punctured channel table in the punctured SU (or MU-MIMO) frame format. The example compression modes are summarized in Table 1.

TABLE 1

| | Single User (SU) | Multiple Users (MU) | |
| | | MU-MIMO | OFDMA |
| --- | --- | --- | --- |
| Full Bandwidth | | Compression Mode 1 | No Compression |
| Punctured | | Compression Mode 2 | |

As shown in Table 1, a first compression mode (compression mode 1) may be used for full-bandwidth SU or MU-MIMO communications, a second compression mode (compression mode 2) may be used for punctured SU or MU-MIMO communications, and no compression may be used for OFDMA (full-bandwidth or punctured) communications.

In some other implementations, the SU PPDU format (described with respect to FIG. 11B) may be used for full-bandwidth SU communications while the full-bandwidth MU-MIMO PPDU format may be implemented as a compression mode of the MU PPDU format. The punctured SU or MU-MIMO PPDU format may still be implemented as separate compression mode of the MU PPDU format. The example compression modes are summarized in Table 2.

TABLE 2

| | Single User (SU) | Multiple Users (MU) | |
| | | MU-MIMO | OFDMA |
| --- | --- | --- | --- |
| Full Bandwidth | SU PPDU Format | Compression Mode 1 | No Compression |
| Punctured | Compression Mode 2 | | |

As shown in Table 2, the SU PPDU format may be used for full-bandwidth SU communications, a first compression mode (compression mode 1) may be used for full-bandwidth MU-MIMO communications, a second compression mode (compression mode 2) may be used for punctured SU or MU-MIMO communications, and no compression may be used for OFDMA (full-bandwidth or punctured) communications. By selectively compressing one or more fields or subfields of the MU PPDU 1120, aspects of the present disclosure may provide a unified PPDU format usable for full-bandwidth or punctured SU and MU communications.

Figure 11D:
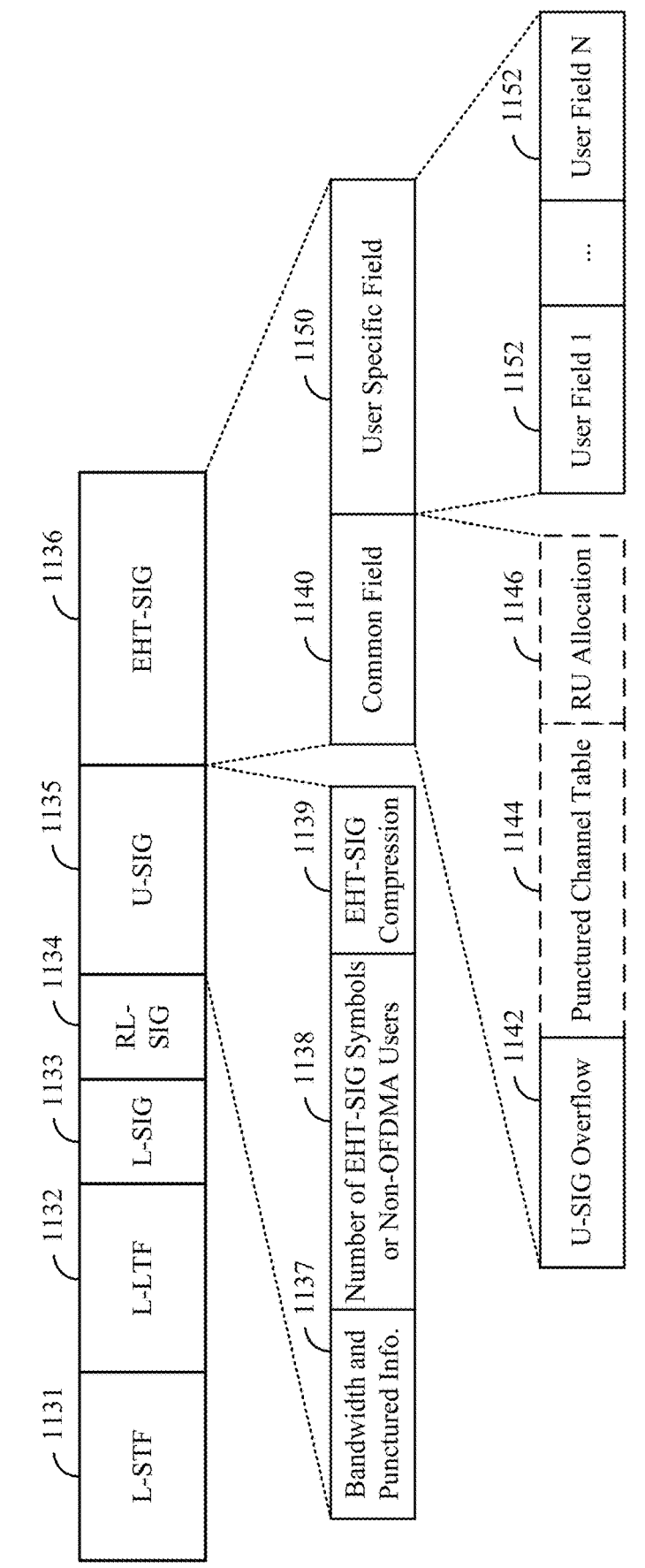
FIG. 11D shows an example frame structure for a unified PPDU according to some implementations.

FIG. 11D shows an example frame structure for a unified PPDU 1130 according to some implementations. The unified PPDU 1130 may be an example implementation of the PPDU 1000 of FIG. 10. For simplicity, only the pre-EHT portion of the unified PPDU 1130 (corresponding to the portion 1050 of PPDU 1000) is shown in FIG. 11D. The unified PPDU 1130 includes an L-STF 1131, an L-LTF 1132, an L-SIG 1133, an RL-SIG 1134, a U-SIG 1135, and an EHT-SIG 1136 which may correspond to L-STF 1008, L-LTF 1010, L-SIG 1012, RL-SIG 1014, U-SIG 1016, and EHT-SIG 1016, respectively, of PPDU 1000. In the example unified PPDU format, U-SIG 1135 may include a bandwidth and punctured information field 1137, a number of EHT-SIG symbols or non-OFDMA users field 1138, and an EHT-SIG compression field 1139. The EHT-SIG 1136 may include a common field 1140 and a user specific field 1150. The EHT-SIG 1136 may be encoded as multiple symbols (using BPSK, rate ½ encoding) and have an adjustable MCS.

In some implementations, the unified PPDU 1130 may be configured for full-bandwidth SU or MU-MIMO communications, punctured SU or MU-MIMO communications, or OFDMA communications. With reference for example to Tables 1 and 2, the unified PPDU 1130 may be configured in the first compression mode, the second compression mode, or without compression. When no compression is implemented, the unified PPDU 1130 may be configured for OFDMA, and the common field 1140 may include U-SIG overflow 1142 and RU allocation information 1146. When the first compression mode is implemented, the unified PPDU 1130 may be configured for full-bandwidth SU or MU-MIMO communications, and the common field 1140 may include U-SIG overflow 1142 while omitting RU allocation information 1146. When the second compression mode is implemented, the unified PPDU 1130 may be configured for punctured SU or MU-MIMO communications, and the common field 1140 may include a punctured channel table 1144 (in lieu of RU allocation information 1146). The punctured channel table 1144 may include a number of bits (~8) indicating the punctured channels of the unified PPDU 1130. In some implementations, the punctured channels may be specified with a 20 MHz granularity.

The EHT-SIG compression field 1139 may be used to indicate the mode or configuration of the unified PPDU 1130. In some implementations, the EHT-SIG compression field 1139 may include 2 bits that can be used to indicate any of the 3 different configurations (such as the first compression mode, the second compression mode, or no compression). In some other implementations, the EHT-SIG compression field 1139 may include 1 bit that can be used to indicate whether the unified PPDU 1130 is configured for compression (or no compression) while the bandwidth and punctured information field 1137 may be used to further differentiate between the first compression mode and the second compression mode.

One or more of the compression modes may be used for SU or MU-MIMO communications. For example, the first compression mode may be used for full-bandwidth SU or full-bandwidth MU-MIMO communications (such as shown in Table 1). Similarly, the second compression mode may be used for SU preamble puncturing or MU-MIMO preamble puncturing (such as shown in Tables 1 and 2). In some implementations, the number of EHT-SIG symbols or non-OFDMA users field 1138 may include an integer number (n) that can be used to indicate whether the unified PPDU 1130 is configured for SU or MU-MIMO communications when implementing one of the compression modes. More specifically, n+1 may correspond to the number of non-OFDMA users associated with the unified PPDU 1130. Thus, a value n=0 may indicate SU communications and any value n≥1 may indicate MU-MIMO communications.

The user specific field 1150 includes a number of user fields 1152. The number of user fields 1152 may depend on the total number of users associated with the unified PPDU 1130. When configured for SU communications (in the first compression mode or the second compression mode), a single user field 1152 may be formatted according to a non-MU-MIMO allocation format. The user field for a non-MU-MIMO allocation may include $N_{STS}$ (likely 4 bits), beamformed (1 bit), and DCM (1 bit) subfields (indicating a number of space-time streams, whether beamforming is used, and whether DCM is used, respectively) that are not present in the user field for a MU-MIMO allocation. When configured for MU-MIMO communications (in the first compression mode or the second compression mode), multiple user fields may be formatted according to a MU-MIMO allocation format. The user field for a MU-MIMO allocation may include a spatial configuration subfield (indicating a number of spatial streams for a STA) that is not present in the user field for the non-MU-MIMO allocation.

Figure 11E:
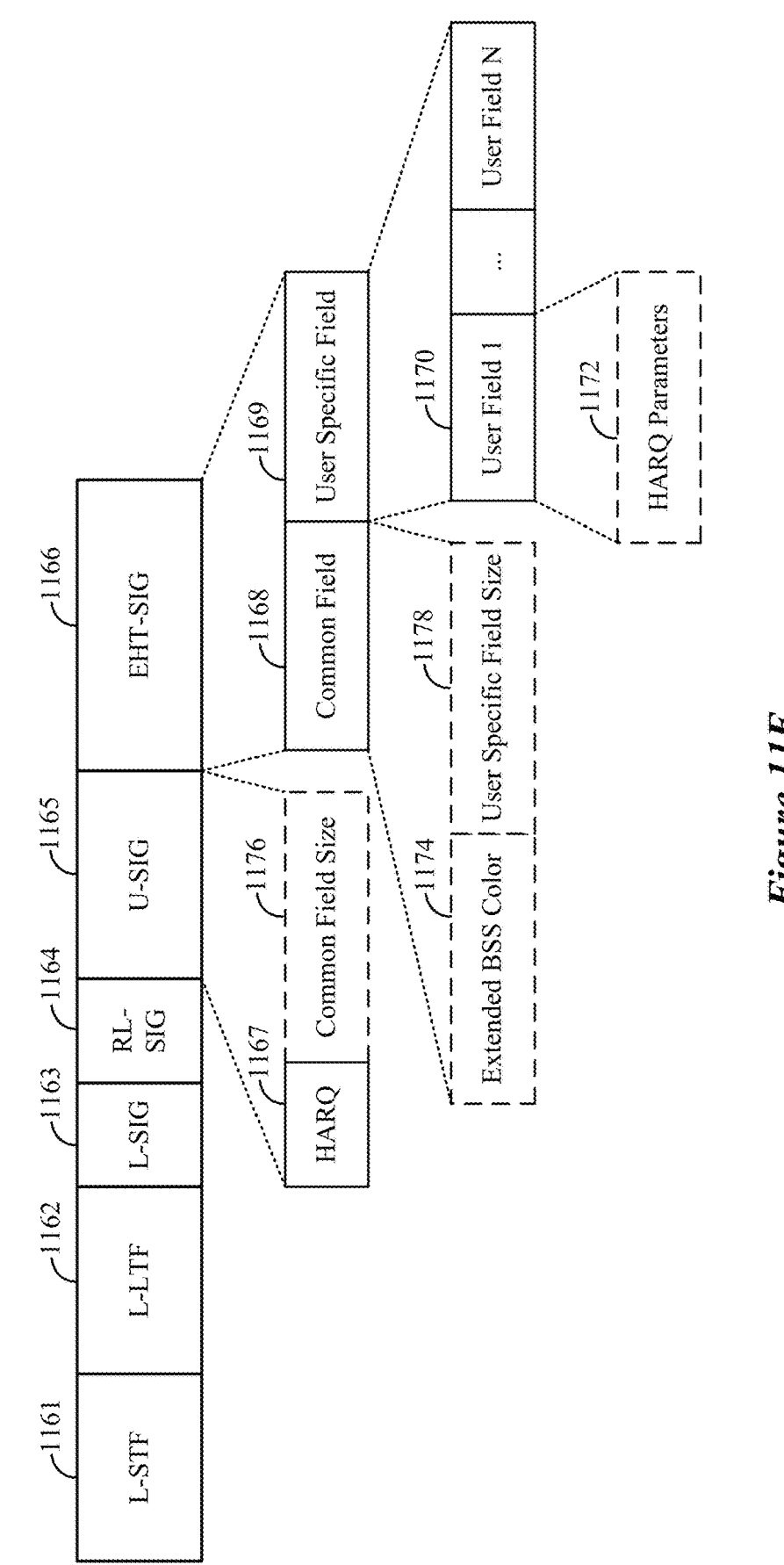
FIG. 11E shows an example PPDU usable for hybrid automatic repeat request (HARQ)-based communications according to some implementations.

FIG. 11E shows an example PPDU 1160 usable for hybrid automatic repeat request (HARQ)-based communications according to some implementations. In some implementations, the PPDU 1160 may be one example of the unified PPDU 1130 of FIG. 11D. In some other implementations, the PPDU 1160 may represent a new PPDU format. For simplicity, only the pre-EHT portion of the PPDU 1160 (corresponding to portion 1050 of the PPDU 1000) is shown in FIG. 11E. The PPDU 1160 includes an L-STF 1161, an L-LTF 1162, an L-SIG 1163, an RL-SIG 1164, a U-SIG 1165, and an EHT-SIG 1166 which may correspond to L-STF 1008, L-LTF 1010, L-SIG 1012, RL-SIG 1014, U-SIG 1016, and EHT-SIG 1016, respectively, of PPDU 1000. In the example of FIG. 11E, EHT-SIG 1166 includes a common field 1168 and a user specific field 1169. The user specific field 1169 further includes a number (N) of user fields 1170. In some implementations, U-SIG 1165 may include a hybrid automatic repeat request (HARQ) field or subfield 1167.

HARQ is a technique by which a receiving device may request retransmission of data that was received in error. Among other advantages, HARQ allows for buffering and combining of incorrectly received data (such as frames, PDUs, MPDUs, and the like) to potentially reduce the number of retransmissions needed to properly reconstruct a particular unit of data. Aspects of the present disclosure recognize that HARQ is a user-specific option and may not be common for all recipients of a given packet or PPDU. Moreover, HARQ may not be supported by devices operating in accordance with some versions of the IEEE 802.11 standards. Thus, in some implementations, the HARQ field 1167 may signal whether at least one user associated with the PPDU 1160 is configured for HARQ. For example, the HARQ field 1167 may include one bit of information to indicate that no recipients of the PPDU 1160 are configured for HARQ (such as by a bit value of "0") or that one or more recipients of the PPDU 1160 are configured for HARQ (such as by a bit value of "1"). In some aspects, the HARQ field 1167 may be implemented as a version-dependent field (such as one of the version-dependent fields 1034 of FIG. 10).

In some implementations, the HARQ field 1167 may signal whether EHT-SIG 1166 includes additional HARQ-related parameters. In some aspects, one or more HARQ parameters 1172 may be included in individual user fields 1170 of the user specific field 1169. Example HARQ parameters 1172 may include user-specific information such as, for example, a wireless station identifier (STA ID), a HARQ on or off bit, a transmission number in a HARQ sequence, a punctured ratio in new data, a repeated ratio in retransmitted data, and a scrambling seed. The transmission number may include one or more bits depending on the number of transmissions (or retransmissions) permitted for a given HARQ sequence. In some implementations, the common field 1168 also may include one or more HARQ-related subfields such as, for example, an extended BSS color subfield 1174. The extended BSS color field 1174 may include one or more bits that can be combined with the BSS color information in U-SIG to provide a more detailed or accurate representation of the BSS color, and thus allow for more reliable BSS identification.

In accordance with existing IEEE 802.11 standards, user field boundaries (in the MAC layer) are aligned with code block boundaries (in the PHY layer). In other words, code blocks decoded at the PHY layer translates directly to user-specific information in the MAC layer. However, aspects of the present disclosure recognize that the additional HARQ parameters 1172 may alter the size and coding structure of the user specific field 1169. In some implementations, the user specific field 1169 may use different size code blocks when one or more user fields 1170 include HARQ parameters 1172 (compared to when the user fields 1170 do not include HARQ parameters 1172) to maintain alignment between user field boundaries and code block boundaries. In some other implementations, the user specific field 1169 may implement a fixed code block size (such as 52 bits, including 42 bits of signaling, a 4-bit CRC and a 6-bit tail) such that user field boundaries may not be aligned with code block boundaries when one or more user fields 1170 include HARQ parameters 1172. In other words one user field 1170 may cross two or more code blocks.

As described above, some devices may support HARQ signaling in the preamble of the PPDU 11600 while others may not. In particular, devices operating in accordance with earlier versions of the IEEE 802.11be amendment (referred to herein as "R1 devices") may support various features of U-SIG 1165 and EHT-SIG 1166 with the exception of potential features for later versions of the IEEE 802.11be amendment (referred to herein as "R2 devices"), e.g., HARQ, whereas devices operating in accordance with later versions of the IEEE 802.11be amendment (referred to herein as "R2 devices") may support signaling of those R2 features, e.g., HARQ signaling in U-SIG 1165 and EHT-SIG 1166. Because the HARQ field 1167 may alter the structure of EHT-SIG 1166 to include one or more HARQ-related parameters, R1 devices may be unable to interpret EHT-SIG 1166 if the HARQ field 1167 indicates that the PPDU 1160 carries HARQ-related parameters for one or more users. In some implementations, the PPDU 1160 may only be used to carry information for R2 devices. In other words, data for R1 devices will not be multiplexed with data for R2 devices using the PPDU format of FIG. 11E.

In some other implementations, the PPDU 1160 may be configured such that R1 devices and R2 devices can interpret U-SIG 1165 and EHT-SIG 1166. This may allow data for R1 devices to be multiplexed with data for R2 devices using the PPDU format of FIG. 11E. In some aspects, the common field 1168 and user-specific field 1168 of EHT-SIG 1166 may have fixed sizes and fixed field structure for R1 signaling fields that are known to R1 devices. Moreover, the fixed sizes of the common field 1168 and user-specific field 1168 may be large enough to accommodate signaling for R2 features, e.g., HARQ signaling for R2 devices. For example, the common field 1168 or user specific field 1169 may include one or more reserved bits as placeholders for signaling for R2 features, e.g., HARQ-related parameters (when such bits are not otherwise used for HARQ signaling). In some other aspects, the size or length of EHT-SIG 1166 may be explicitly indicated through additional signaling. For example, as shown in FIG. 11E, U-SIG 1165 may include an additional field 1176 to indicate a size of the common field 1168 in EHT-SIG 1166. Further, the common field 1168 may include an additional field 1178 to indicate a size of the user specific field 1169.

Figure 12:
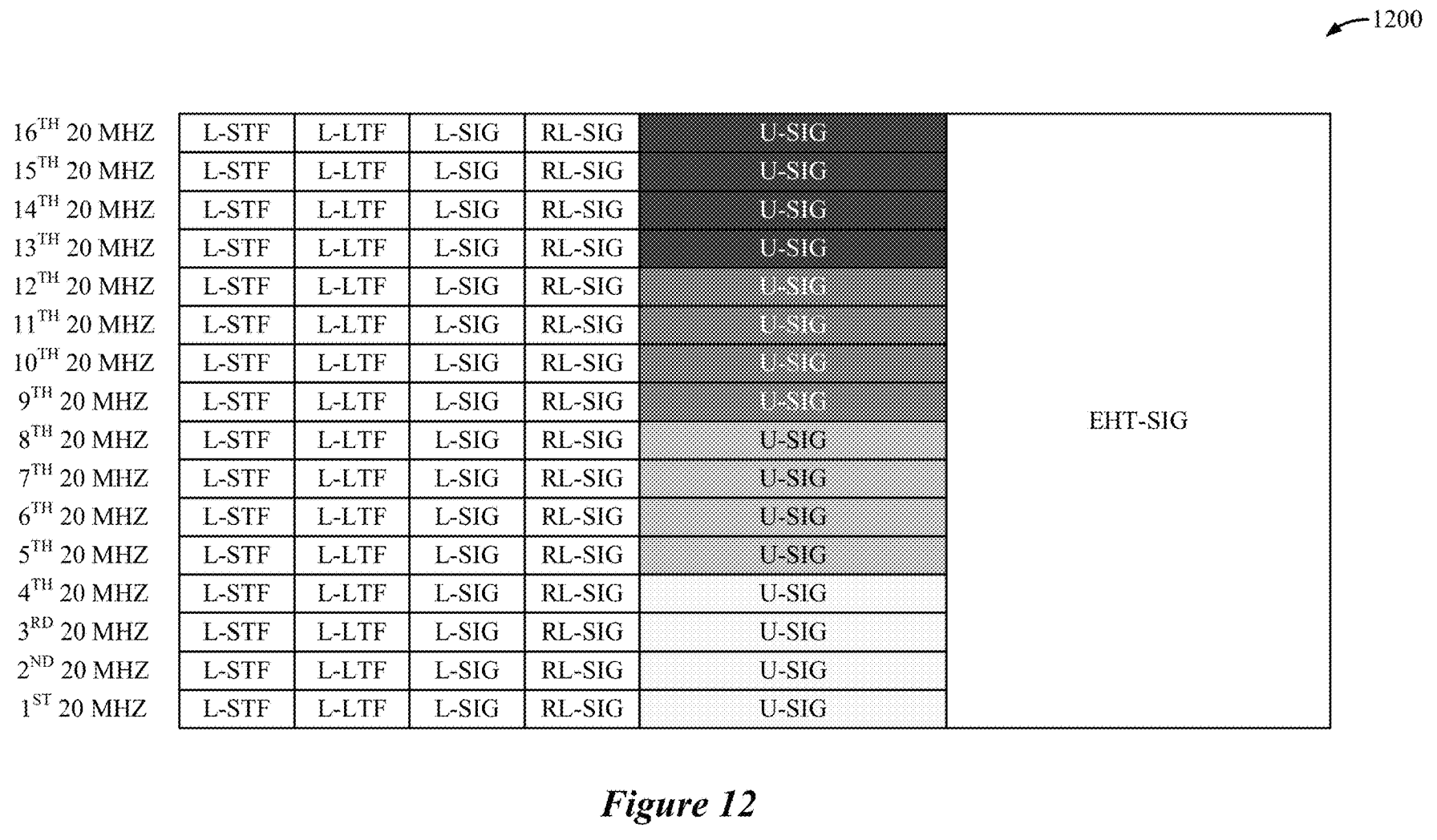

FIG. 12 shows an example frame structure of an EHT PPDU 1200 allocated over multiple subchannels of a wireless channel according to some implementations. In the example of FIG. 12, the wireless channel spans a 320 MHz frequency spectrum. However, in other implementations, the wireless channel may encompass any range of frequencies including, but not limited to, a 160 MHz frequency spectrum, a 240 MHz frequency spectrum, a 480 MHz frequency spectrum, or a 640 MHz frequency spectrum. Each subchannel corresponds to a respective 20 MHz frequency segment of the wireless channel. As shown in FIG. 12, the 320 MHz frequency spectrum includes sixteen 20 MHz segments indexed from lowest to highest (such as from the $1^{st}$ to the $16^{th}$).

In some implementations, U-SIG may be duplicated or repeated in each 20 Mhz subchannel of a respective one of four groupings of four consecutive 20 MHz subchannels. For example, the first four subchannels ($1^{st}$ through $4^{th}$) may share the same U-SIG fields and values. The next four subchannels ($5^{th}$ through $8^{th}$) may share the same U-SIG fields and values, which may be different than the U-SIG fields or values of the previous four subchannels. The next four subchannels ($9^{th}$ through $12^{th}$) may share the same U-SIG fields and values, which in turn may be different than the U-SIG fields or values in any of the previous eight subchannels. The next four subchannels ($13^{th}$ through $16^{th}$) may share the same U-SIG fields and values, which in turn may be different than the U-SIG fields or values in any of the previous twelve subchannels. In other words, the U-SIG fields or values may change every 80 MHz. This may allow for greater parallelization of U-SIG information across the various subchannels.

In some implementations, EHT-SIG may be signaled on a number of content channels. Each content channel may be defined by a particular grouping of subchannels. For example, a first content channel may carry the signaling information for all odd-numbered subchannels (such as the $1^{st}$, $3^{rd}$, $5^{th}$, $7^{th}$, $9^{th}$, $11^{th}$, $13^{th}$, and $15^{th}$ 20 MHz subchannels) and a second content channel may carry the signaling information for all even-numbered subchannels (such as the $2^{nd}$, $4^{th}$, $6^{th}$, $8^{th}$, $10^{th}$, $12^{th}$, $14^{th}$, and $16^{th}$ MHz subchannels). In some implementations, EHT-SIG may be duplicated or repeated per content channel. For example, the (odd-numbered) subchannels associated with the first content channel may share the same EHT-SIG fields and values. The (even-numbered) subchannels associated with the second content channel may share the same EHT-SIG fields and values, which may be different than the EHT-SIG fields or values of the first content channel.

In some implementations, the new RU allocation format may correspond to a bitmap $a_1a_2 \ldots a_n$, where each of the bits $a_1$-$a_n$ represents a respective one of the 20 MHz subchannels. For example, an 80 MHz channel bandwidth may be represented by a 4-bit bitmap $a_1a_2a_3a_4$ corresponding to the Pt, $2^{nd}$ 3rd and $4^{th}$ 20 MHz subchannels, respectively, of the 80 MHz channel. In some implementations, the bitmap may be distributed across two content channels such that each content channel includes a 2-bit bitmap indicating the punctured channels of the two (even or odd) 20 MHz subchannels for that content channel. For example, a first content channel may use $a_1a_3$ to indicate the punctured channels of the $1^{st}$ and $3^{rd}$ 20 MHz subchannels and the second content channel may use $a_2$ $a_4$ to indicate the punctured channels of the $2^{nd}$ and $4^{th}$ 20 MHz subchannels. In some other implementations, the punctured channels may be determined based on an existing punctured channel indication (for an 80 MHz channel) in U-SIG.

A 160 MHz channel bandwidth may be represented by an 8-bit bitmap $a_1a_2a_3a_4a_5a_6a_7a_8$ corresponding to the $1^{st}$, $2^{nd}$, $3^{rd}$, $4^{th}$, $5^{th}$, $6^{th}$, $7^{th}$ and $8^{th}$ 20 MHz subchannels, respectively, of the 160 MHz channel. In some implementations, the bitmap may be distributed across two content channels such that each content channel includes a 4-bit bitmap indicating the punctured channels of the four (even or odd) 20 MHz subchannels for that content channel. For example, a first content channel may use $a_1a_3a_5a_7$ to indicate the punctured channels of the $1^{st}$, $3^{rd}$, $5^{th}$, and $7^{th}$ 20 MHz subchannels and the second content channel may use $a_2a_4a_6a_8$ to indicate the punctured channels of the $2^{nd}$, $4^{th}$, $6^{th}$, and $8^{th}$ 20 MHz subchannels.

In some other implementations, one or more of the punctured channels may be determined based on an existing punctured channel indication (for an 80 MHz channel) in U-SIG. For example, devices operating in the lower 80 MHz portion of the 160 MHz channel (such as the $1^{st}$ through $4^{th}$ 20 MHz subchannels) may determine the punctured channels of the $1^{st}$, $2^{nd}$, $3^{rd}$, and $4^{th}$ 20 MHz subchannels based on the punctured channel indication in the U-SIG they receive, and devices operating in the upper 80 MHz portion of the 160 MHz channels (such as the $5^{th}$ through $8^{th}$ 20 MHz , subchannels) may determine the puncture channels for the $5^{th}$, $6^{th}$, $7^{th}$, and $8^{th}$ 20 MHz subchannels based on the punctured channel indication in the U-SIG they receive. Each of the content channels may further include 2 exclusive-or (XOR) bits that can be used to determine the remaining bits of the bitmap. For example, the first content channel may include a first XOR bit representing XOR ($a_1$, $a_5$) and a second XOR bit representing XOR ($a_3$, $a_7$). Accordingly, a device with knowledge of a 1 and $a_3$ can derive $a_5$ and $a_7$ using the first and second XOR bits, and vice-versa. The second content channel may include a third XOR bit representing XOR ($a_2$, $a_6$) and a fourth XOR bit representing XOR ($a_4$, $a_8$). Accordingly, a device with knowledge of a 2 and $a_4$ can derive $a_6$ and $a_8$ using the third and fourth XOR bits, and vice-versa.

A 320 MHz channel bandwidth may be represented by an 16-bit bitmap $a_1a_2a_3a_4a_5a_6a_7a_8a_9a_{10}a_{11}a_{12}a_{13}a_{14}a_{15}a_{16}$ corresponding to the $1^{st}$, $2^{nd}$, 3rd, $4^{th}$, $5^{th}$, $6^{th}$, $7^{th}$, $8^{th}$, $10^{th}$, $11^{th}$, $12^{th}$, $13^{th}$, $14^{th}$, $15^{th}$, and $16^{th}$ 20 MHz subchannels, respectively, of the 320 MHz channel. In some implementations, the bitmap may be distributed across two content channels such that each content channel includes an 8-bit bitmap indicating the punctured channels of the eight (even or odd)

20 MHz subchannels for that content channel. For example, a first content channel may use $a_1a_3a_5a_7a_9a_{11}a_{13}a_{15}$ to indicate the punctured channels of the $1^{st}$, $3^{rd}$, $5^{th}$, $7^{th}$, $9^{th}$, $11^{th}$, $13^{th}$ and $15^{th}$ 20 MHz subchannels and the second content channel may use $a_2a_4a_6a_8a_{10}a_{12}$ $a_{14}$ $a_{16}$ to indicate the punctured channels of the $2^{nd}$, $4^{th}$, $6^{th}$, $8^{th}$, $10^{th}$ $12^{th}$, $14^{th}$, and $16^{th}$ 20 MHz subchannels. When implemented using the SU PPDU format, the 8-bit bitmap is added to the 9 bits overflowed from U-SIG (which includes 8 original overflow bits plus the 1-but SU preamble puncturing indication). The resulting number (17) of bits may exceed the 16-bit limit needed to keep EHT-SIG within 1 symbol. Thus, in some implementations, the 9 overflow bits from U-SIG may be distributed in parallel across the two content channels (such that different content channels include different overflow bits).

In some other implementations, one or more of the punctured channels may be determined based on an existing punctured channel indication (for an 80 MHz channel) in U-SIG. For example, devices operating in the lowest 80 MHz portion of the 320 MHz channel may determine the punctured channels of the $1^{st}$, $2^{nd}$, $3^{rd}$, and $4^{th}$ 20 MHz subchannels based on the punctured channel indication in the U-SIG they receive, devices operating in the second-lowest 80 MHz portion of the 320 MHz channel may determine the punctured channels of the $5^{th}$, $6^{th}$,$7^{th}$, and $8^{th}$ 20 MHz subchannels based on the punctured channel indication in the U-SIG they receive, devices operating in the second-highest 80 MHz portion of the 320 MHz channel may determine the punctured channels of the $9^{th}$, $10^{th}$, and $12^{th}$ 20 MHz subchannels based on the punctured channel indication in the U-SIG they receive, and devices operating in the highest 80 MHz portion of the 320 MHz channel may determine the punctured channels of the $13^{th}$, 14th, $15^{th}$ and $16^{th}$ 20 MHz subchannels based on the punctured channel indication in the U-SIG they receive.

Each of the content channels may further include 2 exclusive-or (XOR) bits that can be used to determine the remaining bits of the corresponding 80 MHz portion in addition to a 4-bit bitmap for the other 160 MHz portion. For example, the first content channel may include a first XOR bit representing XOR ($a_1$, $a_5$), a second XOR bit representing XOR ($a_3$, $a_7$), and the 4-bit bitmap $a_9a_{11}a_{13}a_{15}$. The second content channel may include a third XOR bit representing XOR ($a_2$, $a_6$), a fourth XOR bit representing XOR ($a_4$, $a_8$), and the 4-bit bitmap $a_{10}$ $a_{12}$ $a_{14}$ $a_{16}$. A third content channel may include a fifth XOR bit representing XOR ($a_9$, $a_{13}$), a sixth XOR bit representing XOR($a_{11}$, $a_{15}$), and the 4-bit bitmap $a_1a_3$ $a_5a_7$. A fourth content channel may include a seventh XOR bit representing XOR ($a_{10}$, $a_{14}$), an eighth XOR bit representing XOR ($a_{12}$, $a_{16}$), and the 4-bit bitmap $a_2a_4$ $a_6a_8$. Although this implementation uses a 4-content channel structure, each receiving device can obtain the full (16-bit) punctured channel bitmap by decoding only the two content channels for the 80 MHz portion in which it operates.

In some implementations, the PHY preamble design may include support for multi-AP transmissions. Multi-AP transmissions are synchronized in time and frequency and therefore require coordination between the multiple APs. Example multi-AP transmission techniques include, but are not limited to, coordinated beamforming (CoBF), joint transmission (JT), coordinated OFDMA (C-OFDMA), and coordinated spatial reuse (C-SR). APs participating in CoBF may beamform transmissions in the respective directions of their intended recipients while forming nulls in the directions of unintended receivers (such as through modulation or precoding). The beamformed portion of the CoBF PPDU may be protected by nulling of overlapping BSS (OBSS) interference. APs participating in JT may use beamforming to collectively transmit beamformed JT PPDUs to the same STA (or set of STAs). The JT PPDU may have improved signal-to-noise ratio (SNR) and gain due to combined beamforming from multiple APs. APs participating in C-OFDMA may be configured to transmit PPDUs different subchannels such that C-OFDMA PPDUs do not interfere with one another even when transmitted concurrently. CoBF, JT and C-OFDMA all require synchronization in time and frequency among participating BSSs. CoBF and JT may further require synchronization in phase among participating BSSs. Furthermore, for CoBF, JT or C-OFDMA, data PPDUs are transmitted using same number of EHT-SIG symbols, same number of EHT-LTF symbols, same EHT-LTF symbol duration, same GI among all participating BSSs.

APs participating in C-SR may share time and frequency resources of a transmit opportunity (TXOP). More specifically, an AP that wins contention and gains access to the wireless medium for the duration of a TXOP (referred to as the TXOP owner) may limit the transmit powers of the APs selected to share the time and frequency resources such that interference from the selected APs does not prevent STAs associated with the TXOP owner from successfully decoding packets transmitted by the TXOP owner. Aspects of the present disclosure recognize that, because inter-BSS interference is mitigated by limiting the transmit power of each AP, such multi-AP transmissions do not need to be orthogonal to one another. Moreover, the transmit power of each AP is pre-negotiated. Thus, no special PPDU type or preamble signaling is needed to coordinate such multi-AP transmissions.

Figures 13A, 13B, 13C:
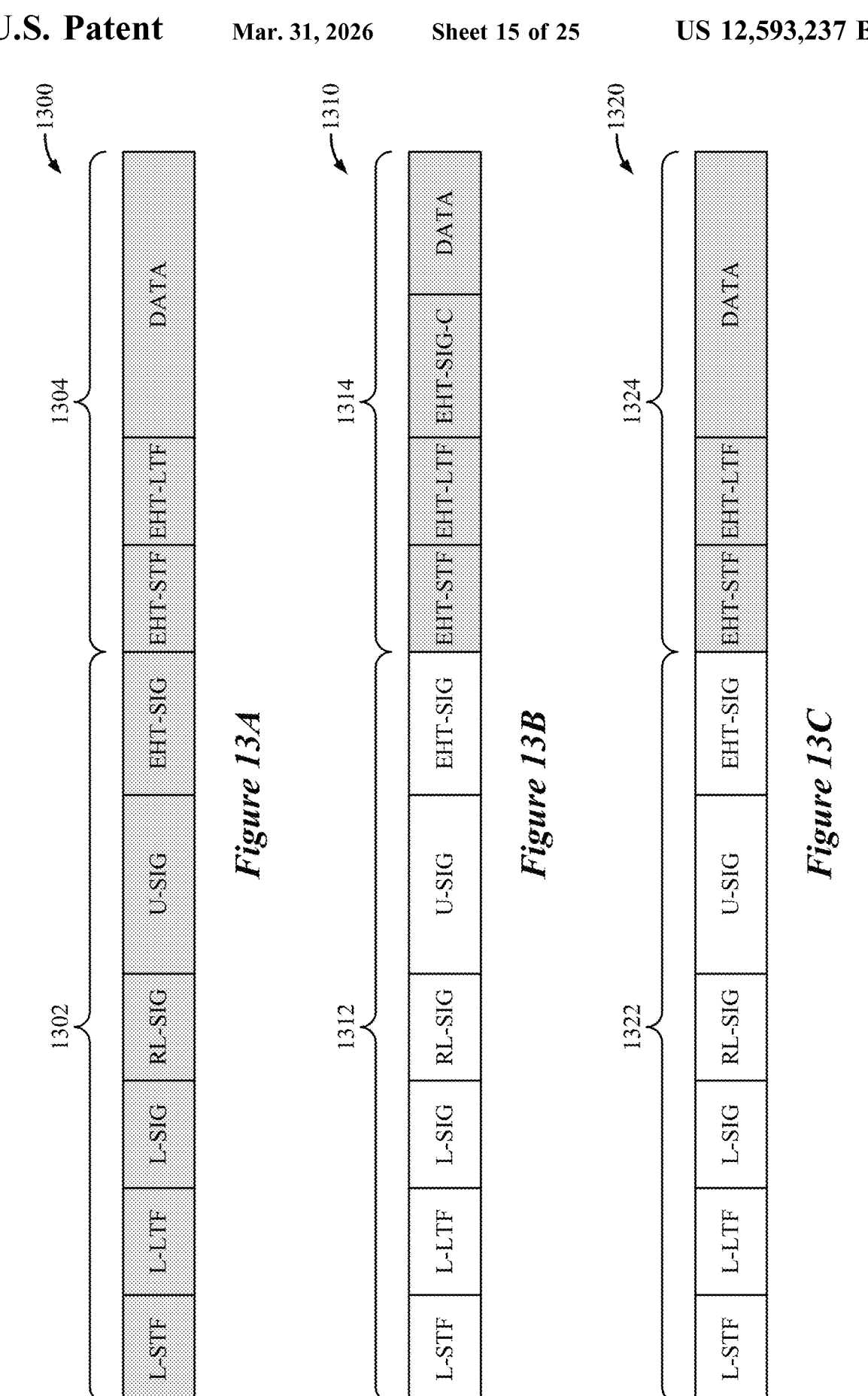
FIG. 13A shows an example coordinated beamforming (CoBF) PPDU usable for communications between APs and STAs in a multi-AP group according to some implementations.
FIG. 13B shows an example CoBF PPDU usable for communications between APs and STAs in a multi-AP group according to some implementations.
FIG. 13C shows an example CoBF PPDU usable for communications between APs and STAs in a multi-AP group according to some implementations.

FIG. 13A shows an example CoBF PPDU 1300 usable for communications between APs and STAs in a multi-AP group according to some implementations. The CoBF PPDU 1300 may be an example implementation of the PPDU 1000 of FIG. 10. The CoBF PPDU 1300 includes a pre-EHT portion 1302 and an EHT portion 1304. In the example of FIG. 13A, beamforming (depicted by shading) is performed on the pre-EHT portion 1302 and the EHT portion 1304. In other words, the entire PPDU 1300 is beamformed. In some implementations, the same beamforming matrix may be applied to the pre-EHT portion 1302 (as a single-stream transmission where multiple streams are identical) and the EHT portion 1304 (as a multi-stream transmission). In some implementations, the CoBF PPDU 1300 may include a beam change bit set to a value of zero.

The CoBF PPDU 1300 may be transmitted by a first AP concurrently with one or more CoBF PPDUs transmitted by other APs in the multi-AP group. In some implementations, the number of EHT-SIG symbols in the PPDU 1300 may be the same as the number of EHT-SIG symbols in the other CoBF PPDUs. Additionally, or alternatively, the duration of the EHT-LTF symbols and guard intervals in the PPDU 1300 may be identical to the duration of EHT-LTF symbols and guard intervals in the other CoBF PPDUs. In some implementations, where EHT-LTF has a symbol duration that is different than a symbol duration used in the data field (such as where 1× or 2× EHT-LTF is used), the EHT-LTF symbol duration and the number of EHT-LTF symbols in the PPDU 1300 also may be the same as the EHT-LTF symbol duration and the number of EHT-LTF symbols in the other CoBF PPDUs.

The CoBF PPDU 1300 may function as a single BSS PPDU without OBSS interference in the beamformed portion of the packet. In some implementations, U-SIG and EHT-SIG in different PPDUs transmitted in different BSSs may carry different signaling information. For example, U-SIG and EHT-SIG in the PPDU 1300 may carry signaling for a single BSS among the group of participating BSSs. Aspects of the present disclosure recognize that, by beamforming the pre-EHT portion 1302 and the EHT portion 1304, the CoBF PPDU 1300 may create a hidden node problem. For example, some wireless communication devices may be unable to detect the beamformed signal and, as a result, may attempt to transmit on the wireless channel at the same time the PPDU 1300 is being transmitted. In some implementations, to avoid hidden node problems, one or more APs may transmit trigger frames to notify other wireless communication devices in the vicinity of the upcoming PPDU 1300. Example suitable trigger frames may include a request to send (RTS) frame or clear to send (CTS)-to-self frame, among other examples.

FIG. 13B shows an example CoBF PPDU 1310 usable for communications between APs and STAs in a multi-AP group according to some implementations. The CoBF PPDU 1310 may be an example implementation of the PPDU 1000 of FIG. 10. The CoBF PPDU 1310 includes a pre-EHT portion 1312 and an EHT portion 1314. In the example of FIG. 13B, beamforming (depicted by shading) is performed only on the EHT portion 1314. The pre-EHT portion 1312 may be transmitted omnidirectionally. In some implementations, symbols transmitted in the pre-EHT portion 1312 may be identical to symbols transmitted in a corresponding pre-EHT portion of any CoBF PPDU transmitted by other APs in the multi-AP group. The CoBF PPDU 1310 may include a group BSSID or BSS color (in U-SIG or EHT-SIG) to identify the multi-AP group.

In some implementations, the pre-EHT portion 1312 may include an EHT-SIG and the EHT portion 1314 may include an EHT-SIG-C. The EHT-SIG in the pre-EHT portion 1312 may only include information common to all BSSs in the multi-AP group (such as a group BSSID or BSS color). For example, EHT-SIG may not include a user specific field or RU allocation information (in the common field). Rather, EHT-SIG-C in the EHT portion 1314 may include information specific to each BSS (such as RU allocation information and user-specific information). In some aspects, the information in EHT-SIG-C for different BSSs may be transmitted in parallel across multiple subchannels to reduce overhead.

FIG. 13C shows an example CoBF PPDU 1320 usable for communications between APs and STAs in a multi-AP group according to some implementations. The CoBF PPDU 1320 may be an example implementation of the PPDU 1000 of FIG. 10. The CoBF PPDU 1320 includes a pre-EHT portion 1322 and an EHT portion 1324. In the example of FIG. 13C, beamforming (depicted by shading) is performed only on the EHT portion 1324. The pre-EHT portion 1322 may be transmitted omnidirectionally. In some implementations, symbols transmitted in the pre-EHT portion 1322 may be identical to symbols transmitted in a corresponding pre-EHT portion of any CoBF PPDU transmitted by other APs in the multi-AP group. The CoBF PPDU 1320 may include a group BSSID or BSS color (in U-SIG or EHT-SIG) to identify the multi-AP group.

In some implementations, information specific to each BSS (such as RU allocation information and user-specific information) may be included in EHT-SIG in the pre-EHT portion 1322. For example, EHT-SIG may include a respective user specific field and RU allocation subfield for each BSS associated with the multi-BSS group. In some aspects, each RU allocation subfield may be identified based on the BSS color of the associated BSS. In some other aspects, each user field (of the user specific field) may be identified based on a combination of the BSS color of the associated BSS and a STA ID of the recipient STA. In the example of FIG. 13C, there is no additional SIG field (such as EHT-SIG-C), in the EHT portion 1324.

Figures 14A, 14B:
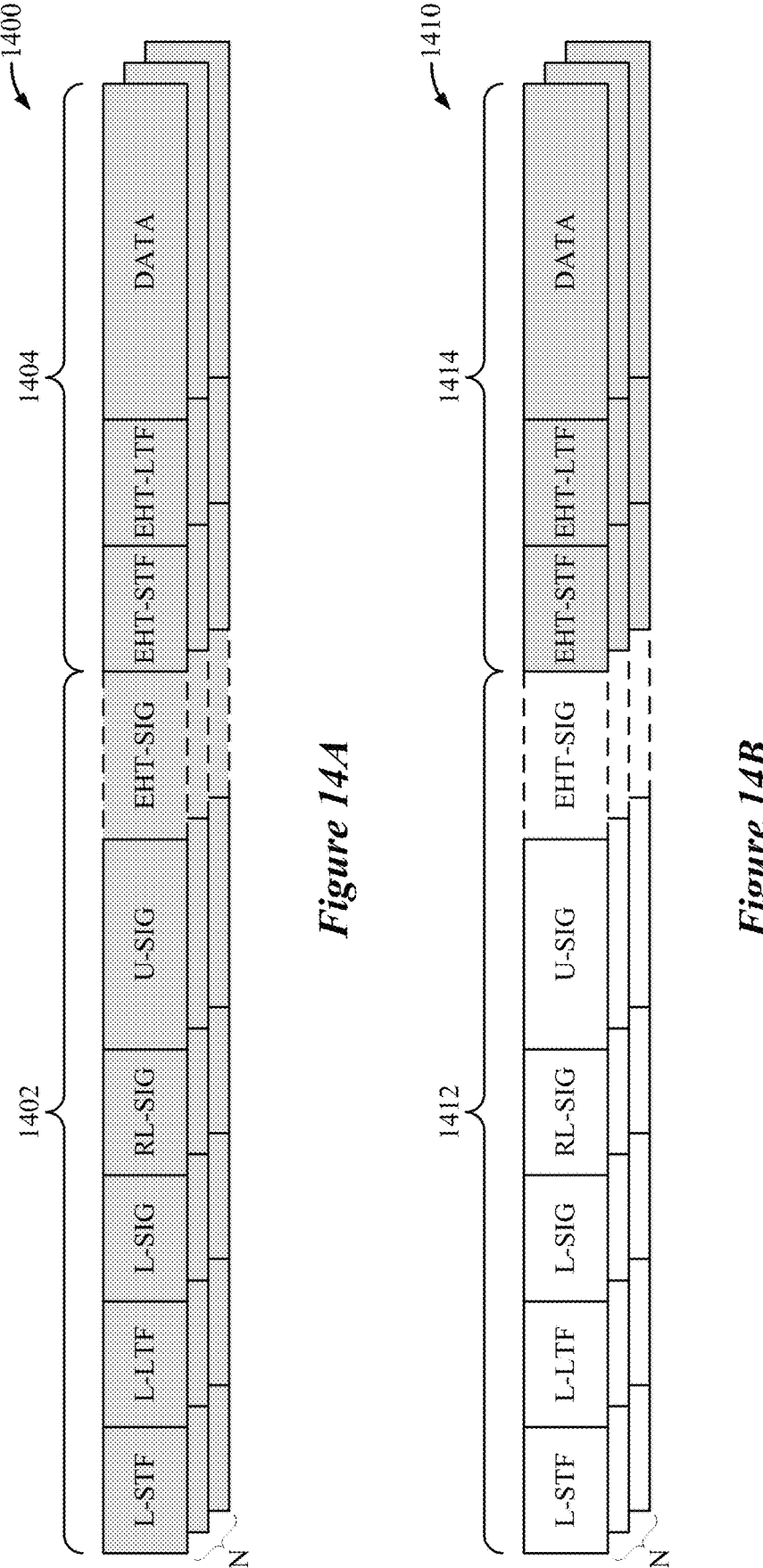
FIG. 14A shows an example joint transmission (JT) PPDU usable for communications between APs and STAs in a multi-AP group according to some implementations.
FIG. 14B shows an example JT PPDU usable for communications between APs and STAs in a multi-AP group according to some implementations.

FIG. 14A shows an example joint transmission (JT) PPDU 1400 usable for communications between APs and STAs in a multi-AP group according to some implementations. The JT sequence is trigger-based and makes sure all participating APs and STAs are synchronized in time, frequency, and phase. In some implementations, gap periods may be periodically inserted into the transmission of the JT PPDU 1400. During the gap periods, one of the APs (such as a master AP) may transmit synchronization signals to the other (slave) APs, e.g., LTF signals. In other words, the slave APs of the multi-AP group may listen for the synchronization signals, during the gap periods, to perform synchronization with the master AP. In some aspects, the data portion of the PPDU 1400 may be subdivided into two or more sections (not shown for simplicity) to coincide with the gaps in transmission.

The JT PPDU 1400 may be an example implementation of the PPDU 1000 of FIG. 10. The JT PPDU 1400 includes a pre-EHT portion 1402 and an EHT portion 1404. In the example of FIG. 14A, beamforming (depicted by shading) is performed on the pre-EHT portion 1402 and the EHT portion 1404. In other words, the entire PPDU 1400 is beamformed. In some implementations, the same beamforming matrix may be applied to the pre-EHT portion 1402 (as a single-stream transmission where multiple streams are identical) and the EHT portion 1404 (as a multi-stream transmission). In some implementations, the JT PPDU 1400 may include a beam change bit set to a value of zero. Aspects of the present disclosure recognize that, by beamforming the pre-EHT portion 1402 and the EHT-portion 1404, the JT PPDU 1400 may create a hidden node problem (such as described with respect to FIG. 13A). In some implementations, to avoid hidden node problems, one or more of the APs may transmit trigger frames to notify other wireless communication devices in the vicinity of the upcoming PPDU 1400. Example suitable trigger frames may include an RTS frame or a CTS-to-self frame, among other examples.

The JT PPDU 1400 may be transmitted to the same STA or set of STAs by multiple (N) APs in the multi-AP group. The JT PPDU 1400 may include a group BSSID or BSS color (in U-SIG or EHT-SIG) to identify the multi-AP group. In some implementations, each user field in EHT-SIG may include a <BSS color, STA ID> tuple to uniquely identify each AP-STA pair, where the BSS color represents the original BSS color of the AP. In some other implementations, the APs in the multi-AP group may negotiate a number of STA IDs that can uniquely identify each participating STA prior to transmission of the JT PPDU 1400. By pre-negotiating a set of unique STA IDs, the STA IDs can be left out of the user fields in EHT-SIG.

In some implementations, one or more of the APs may transmit a trigger frame or setup packet, prior to the transmission of the PPDU 1400, to provide STA-specific signaling information to the participating STAs of the multi-AP group. Example suitable trigger frames may include an RTS frame or a CTS-to-self frame, among other examples. For example, the trigger frame or setup packet may include any user-specific information that would otherwise be included in the common field or the user specific field of EHT-SIG. Thus, in some aspects, EHT-SIG may be excluded from the JT PPDU 1400 carrying user data. In other words, the structure of the JT PPDU 1400 may be similar to that of the TB PPDU format described with reference to FIG. 13A.

FIG. 14B shows an example JT PPDU 1410 usable for communications between APs and STAs in a multi-AP group according to some implementations. The JT sequence is trigger-based and makes sure all participating APs and STAs are synchronized in time, frequency, and phase. In some implementations, gap periods may be periodically inserted into the transmission of the JT PPDU 1410. During the gap periods, one of the APs (such as a master AP) may transmit synchronization signals to the other (slave) APs, e.g., LTF signal. In other words, the slave APs of the multi-AP group may listen for the synchronization signals, during the gap periods, to perform synchronization with the master AP. In some aspects, the data portion of the PPDU 1410 may be subdivided into two or more sections (not shown for simplicity) to coincide with the gaps in transmission.

The JT PPDU 1410 may be an example implementation of the PPDU 1000 of FIG. 10. The JT PPDU 1410 includes a pre-EHT portion 1412 and an EHT portion 1414. In the example of FIG. 14B, beamforming (depicted by shading) is performed only on the EHT portion 1414. The pre-EHT portion 1412 may be transmitted omnidirectionally. In some implementations, symbols transmitted in the pre-EHT portion 1412 may be identical to symbols transmitted in a corresponding pre-EHT portion of any JT PPDU transmitted by other APs in the multi-AP group. The JT PPDU 1410 may be transmitted to the same STA or set of STAs by multiple (N) APs in the multi-AP group. The JT PPDU 1410 may include a group BSSID or BSS color (in U-SIG or EHT-SIG) to identify the multi-AP group. In some implementations, each user field in EHT-SIG may include a <BSS color, STA ID> tuple to uniquely identify each AP-STA pair, where the BSS color represents the original BSS color of the AP.

In some other implementations, the APs in the multi-AP group may negotiate a number of STA IDs that can uniquely identify each participating STA prior to transmission of the JT PPDU 1410. For example, each AP may transmit a PHY setup packet to its associated STAs to assign new STA IDs to each participating STA in the multi-AP group. By pre-negotiating a set of unique STA IDs, the STA IDs can be used in the user fields in EHT-SIG to uniquely identify each participating STA. This pre-negotiation may be done in a quasi-static way. In some other implementations, each user field in EHT-SIG may include a <BSS index, STA ID> tuple to uniquely identify each AP-STA pair. The BSS index, in general using fewer bits compared to BSS color, is pre-negotiated for each participating BSS in the multi-AP group. In some other implementations, new fields may be added in the common field to indicate the number of participating BSSs and the BSS color of each participating BSS. Each user field in EHT-SIG may further include a <BSS index, STA ID> tuple to uniquely identify each AP-STA pair.

Still further, in some implementations, one or more of the APs may transmit a trigger frame or setup packet, prior to the transmission of the PPDU 1410, to provide STA-specific signaling information to the participating STAs of the multi-AP group. Example suitable trigger frames may include an RTS frame or a CTS-to-self frame, among other examples. For example, the trigger frame or setup packet may include any user-specific information that would otherwise be included in the common field and/or the user specific field of EHT-SIG. Thus, in some aspects, EHT-SIG may be excluded from the JT PPDU 1410 carrying user data. In other words, the structure of the JT PPDU 1410 may be similar to that of the TB PPDU format described with reference to FIG. 13A.

Figures 15A, 15B:
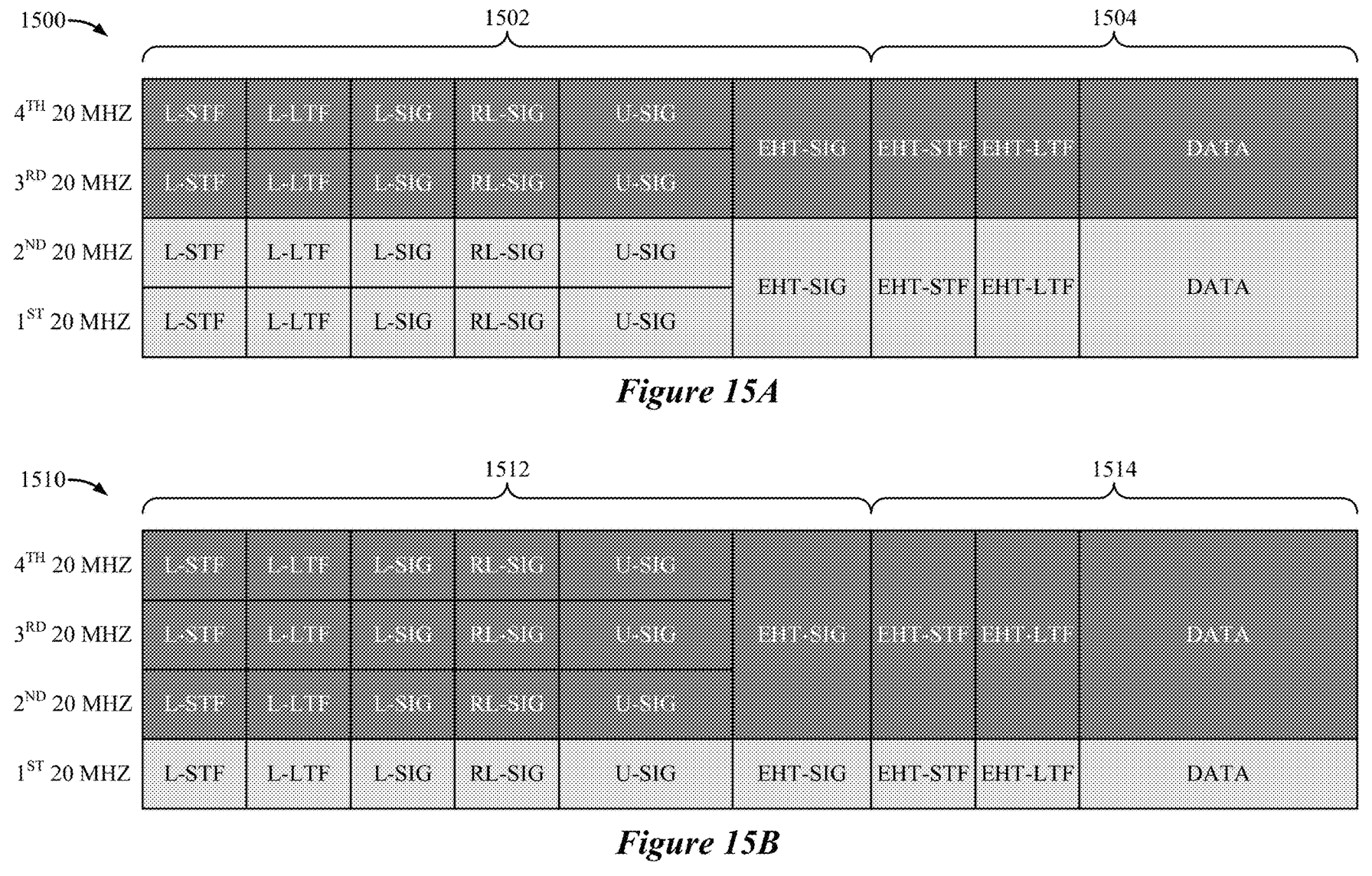

FIG. 15A shows an example C-OFDMA PPDU configuration 1500 usable for DL communications between APs and STAs in a multi-AP group according to some implementations. The C-OFDMA PPDU configuration 1500 includes two C-OFDMA PPDUs transmitted over different subchannels of an 80 MHz channel. In the example of FIG. 15A, a first AP may transmit a first C-OFDMA PPDU (shown with lighter shading) on the $1^{st}$ and $2^{nd}$ 20 MHz subchannels of the 80 MHz channel and a second AP may transmit a second C-OFDMA PPDU (shown with darker shading) on the $3^{rd}$ and $4^{th}$ 20 MHz subchannels of the 80 MHz channel. Each C-OFDMA PPDU may be an example implementation of the PPDU 1000 of FIG. 10. In actual implementations, the configuration 1500 may include any number of C-OFDMA PPDUs transmitted, concurrently, over any frequency spectrum.

Each C-OFDMA PPDU includes a pre-EHT portion 1502 and an EHT portion 1504. The pre-EHT portion 1502 includes an L-STF, an L-LTF, an L-SIG, an RL-SIG, a U-SIG, and an EHT-SIG. The EHT portion 1504 includes an EHT-STF, an EHT-LTF, and a data field. In some implementations, the pre-EHT portion 1502 of the first C-OFDMA PPDU may carry signaling information specific to the BSS of the first AP and the pre-EHT portion 1502 of the second C-OFDMA PPDU may carry signaling information specific to the BSS of the second AP. For example, U-SIG may carry BSS-specific information bandwidth and punctured channel information and EHT-SIG may carry BSS-specific RU allocation information (or tone plan). In other words, the BSS (which includes any APs and STAs belonging to the BSS) operates in the bandwidth specified by U-SIG, in accordance with the tone plan for the particular PPDU BW set forth in U-SIG. In the example of FIG. 15A, U-SIG of the first C-OFDMA PPDU may specify a first 40 MHz bandwidth (corresponding to the $1^{st}$ and $2^{nd}$ 20 MHz subchannels of the 80 MHz channel) while U-SIG of the second C-OFDMA PPDU may specify a second 40 MHz bandwidth (corresponding to the $3^{rd}$ and $4^{th}$ 20 MHz subchannels of the 80 MHz channel).

In some implementations, the number of EHT-SIG symbols in the first C-OFDMA PPDU may be the same as the number of EHT-SIG symbols in the second C-OFDMA PPDU. In other words, the number of EHT-SIG symbols may be the same on each 20 MHz subchannel. Additionally, or alternatively, the duration of the EHT-LTF symbols and guard intervals in the first C-OFDMA PPDU may be identical to the duration of the EHT-LTF symbols and guard intervals in the second C-OFDMA PPDU. In some implementations, where EHT-LTF has a symbol duration that is different than a symbol duration used in the data field (such as where 1× or 2×EHT-LTF is used), the EHT-LTF symbol duration and the number of EHT-LTF symbols in the first C-OFDMA PPDU also may be the same as the EHT-LTF symbol duration and the number of EHT-LTF symbols in the second C-OFDMA PPDU. In some implementations, the number of EHT-SIG symbols, the number of EHT-LTF symbols, the LTF symbol duration, and the guard interval duration may be pre-negotiated by the APs belonging to the multi-AP group.

FIG. 15B shows another example C-OFDMA PPDU configuration 1510 usable for DL communications between APs and STAs in a multi-AP group according to some implementations. The C-OFDMA PPDU configuration 1510 includes two C-OFDMA PPDUs transmitted over different subchannels of an 80 MHz channel. In the example of FIG. 15B, a first AP may transmit a first C-OFDMA PPDU (shown with lighter shading) on the $1^{st}$ 20 MHz subchannel of the 80 MHz channel and a second AP may transmit a second C-OFDMA PPDU (shown with darker shading) on the $2^{nd}$ $3^{rd}$, and $4^{th}$ 20 MHz subchannels of the 80 MHz channel. Each C-OFDMA PPDU may be an example implementation of the PPDU 1000 of FIG. 10. In actual implementations, the configuration 1510 may include any number of C-OFDMA PPDUs transmitted, concurrently, over any frequency spectrum.

Each C-OFDMA PPDU includes a pre-EHT portion 1512 and an EHT portion 1514. The pre-EHT portion 1512 includes an L-STF, an L-LTF, an L-SIG, an RL-SIG, a U-SIG, and an EHT-SIG. The EHT portion 1514 includes an EHT-STF, an EHT-LTF, and a data field. In some implementations, the pre-EHT portion 1512 of the first C-OFDMA PPDU may carry signaling information specific to the BSS of the first AP and the pre-EHT portion 1512 of the second C-OFDMA PPDU may carry signaling information specific to the BSS of the second AP. For example, U-SIG may carry BSS-specific information bandwidth and punctured channel information and EHT-SIG may carry BSS-specific RU allocation information (or tone plan). In other words, the BSS (which includes any APs and STAs belonging to the BSS) operates in the bandwidth specified by U-SIG, in accordance with the tone plan for the particular PPDU BW set forth in U-SIG. In the example of FIG. 15B, U-SIG of the first C-OFDMA PPDU may specify a 20 MHz bandwidth (corresponding to the $1^{st}$ 20 MHz subchannel of the MHz channel) while U-SIG of the second C-OFDMA PPDU may specify an 80 MHz bandwidth punctured by 20 MHz (corresponding to the $2^{nd}$ $3^{rd}$ and $4^{th}$ 20 MHz subchannels of the 80 MHz channel).

In some implementations, the number of EHT-SIG symbols in the first C-OFDMA PPDU may be the same as the number of EHT-SIG symbols in the second C-OFDMA PPDU. In other words, the number of EHT-SIG symbols may be the same on each 20 MHz subchannel. Additionally, or alternatively, the duration of the EHT-LTF symbols and guard intervals in the first C-OFDMA PPDU may be identical to the duration of the EHT-LTF symbols and guard intervals in the second C-OFDMA PPDU. In some implementations, where EHT-LTF has a symbol duration that is different than a symbol duration used in the data field (such as where 1× or 2×EHT-LTF is used), the EHT-LTF symbol duration and the number of EHT-LTF symbols in the first C-OFDMA PPDU also may be the same as the EHT-LTF symbol duration and the number of EHT-LTF symbols in the second C-OFDMA PPDU. In some implementations, the number of EHT-SIG symbols, the number of EHT-LTF symbols, the LTF symbol duration, and the guard interval duration may be pre-negotiated by the APs belonging to the multi-AP group.

Figures 15C, 15D:
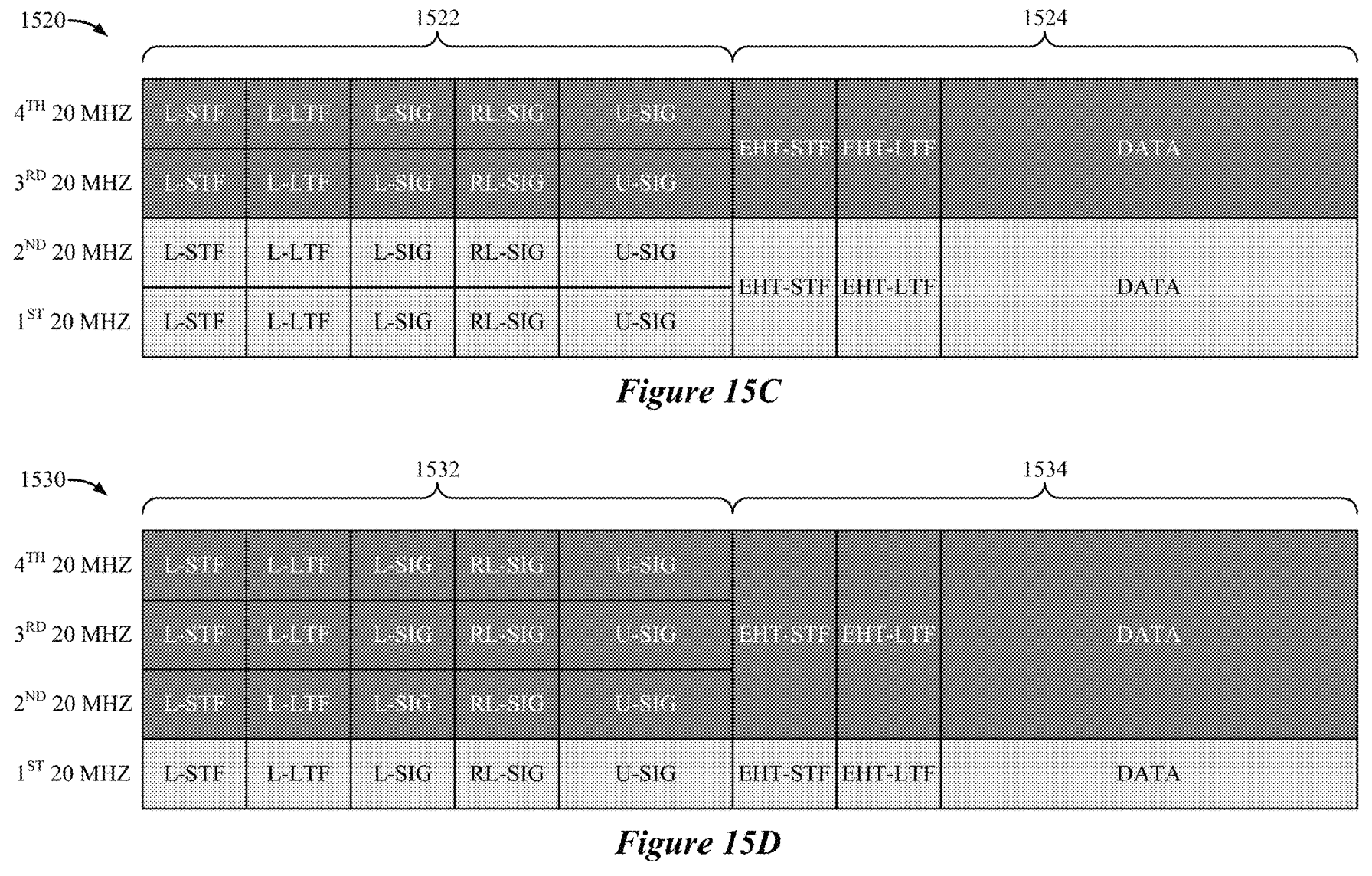

FIG. 15C shows an example C-OFDMA PPDU configuration 1520 usable for UL communications between APs and STAs in a multi-AP group according to some implementations. The C-OFDMA PPDU configuration 1520 includes two C-OFDMA PPDUs transmitted over different subchannels of an 80 MHz channel. In the example of FIG. 15C, a first STA may transmit a first C-OFDMA PPDU (shown with lighter shading) on the $1^{st}$ and $2^{nd}$ 20 MHz subchannels of the 80 MHz channel and a second STA may transmit a second C-OFDMA PPDU (shown with darker shading) on the $3^{rd}$ and $4^{th}$ 20 MHz subchannels of the 80 MHz channel. Each C-OFDMA PPDU may be an example implementation of the PPDU 1000 of FIG. 10. In actual implementations, the configuration 1520 may include any number of C-OFDMA PPDUs transmitted, concurrently, over any frequency spectrum.

Each C-OFDMA PPDU includes a pre-EHT portion 1522 and an EHT portion 1524. The pre-EHT portion 1522 includes an L-STF, an L-LTF, an L-SIG, an RL-SIG, and a U-SIG. Unlike C-OFDMA PPDUs configured for DL communications, C-OFDMA PPDUs configured for UL communications do not include an EHT-SIG. The EHT portion 1524 includes an EHT-STF, an EHT-LTF, and a data field. In some implementations, the pre-EHT portion 1522 of the first C-OFDMA PPDU may carry signaling information specific to the BSS of the first STA and the pre-EHT portion 1522 of the second C-OFDMA PPDU may carry signaling information specific to the BSS of the second STA. For example, U-SIG may carry BSS-specific information bandwidth and punctured channel information. In other words, the BSS (which includes any APs and STAs belonging to the BSS) operates in the bandwidth specified by U-SIG, in accordance with the tone plan for the particular PPDU BW set forth in U-SIG. In the example of FIG. 15C, U-SIG of the first C-OFDMA PPDU may specify a first 40 MHz bandwidth (spanning the $1^{st}$ and $2^{nd}$ 20 MHz subchannels of the 80 MHz frequency spectrum) while U-SIG of the second C-OFDMA PPDU may specify a second 40 MHz bandwidth (spanning the $3^{rd}$ and $4^{th}$ 20 MHz channels of the 80 MHz frequency spectrum).

Additionally, or alternatively, the duration of the EHT-LTF symbols and guard intervals in the first C-OFDMA PPDU may be identical to the duration of the EHT-LTF symbols and guard intervals in the second C-OFDMA PPDU. In some implementations, where EHT-LTF has a symbol duration that is different than a symbol duration used in the data field (such as where 1× or 2×EHT-LTF is used), the EHT-LTF symbol duration and the number of EHT-LTF symbols in the first C-OFDMA PPDU also may be the same as the EHT-LTF symbol duration and the number of EHT-LTF symbols in the second C-OFDMA PPDU. In some implementations, the number of EHT-LTF symbols, the LTF symbol duration, and the guard interval duration may be pre-negotiated by the APs belonging to the multi-AP group.

FIG. 15D shows another example C-OFDMA PPDU configuration 1530 usable for UL communications between APs and STAs in a multi-AP group according to some implementations. The C-OFDMA PPDU configuration 1530 includes two C-OFDMA PPDUs transmitted over different subchannels of an 80 MHz channel. In the example of FIG. 15D, a first STA may transmit a first C-OFDMA PPDU (shown with lighter shading) on the $1^{st}$ 20 MHz subchannel of the 80 MHz channel and a second STA may transmit a second C-OFDMA PPDU (shown with darker shading) on the $2^{nd}$, $3^{rd}$, and $4^{th}$ 20 MHz subchannels of the 80 MHz channel. Each C-OFDMA PPDU may be an example implementation of the PPDU 1000 of FIG. 10. In actual implementations, the configuration 1530 may include any number of C-OFDMA PPDUs transmitted, concurrently, over any frequency spectrum.

Each C-OFDMA PPDU includes a pre-EHT portion 1532 and an EHT portion 1534. The pre-EHT portion 1532 includes an L-STF, an L-LTF, an L-SIG, an RL-SIG, and a U-SIG. Unlike C-OFDMA PPDUs configured for DL communications, C-OFDMA PPDUs configured for UL communications do not include an EHT-SIG. The EHT portion 1534 includes an EHT-STF, an EHT-LTF, and a data field. In some implementations, the pre-EHT portion 1532 of the first C-OFDMA PPDU may carry signaling information specific to the BSS of the first STA and the pre-EHT portion 1532 of the second C-OFDMA PPDU may carry signaling information specific to the BSS of the second STA. For example, U-SIG may carry BSS-specific information bandwidth and punctured channel information and EHT-SIG may carry BSS-specific RU allocation information (or tone plan). In other words, the BSS (which includes any APs and STAs belonging to the BSS) operates in the bandwidth specified by U-SIG, in accordance with the tone plan for the particular PPDU BW set forth in U-SIG. In the example of FIG. 15D, U-SIG of the first C-OFDMA PPDU may specify a 20 MHz bandwidth (corresponding to the $1^{st}$ 20 MHz subchannel of the 80 MHz channel) while U-SIG of the second C-OFDMA PPDU may specify an 80 MHz bandwidth punctured by 20 MHz (corresponding to the $2^{nd}$ $3^{rd}$, and $4^{th}$ 20 MHz subchannels of the 80 MHz channel).

Aspects of the present disclosure recognize that the EHT portion 1534 of a C-OFDMA PPDU may partially intersect or overlap one or more punctured channels. In some implementations, the pre-EHT portion 1532 may not be transmitted on the one or more punctured channels as long as the amount of overlap is below a threshold amount. For example, a portion of the data in the second C-OFDMA PPDU may be carried on one or more subcarriers that overlap or reside in the $1^{st}$ 20 MHz subchannel of the 80 MHz channel. However, the second STA may refrain from transmitting the pre-EHT portion 1532 of the second C-OFDMA PPDU on the $1^{st}$ 20 MHz subchannel as long as the number of overlapping subcarriers is less than a threshold number.

Additionally, or alternatively, the duration of the EHT-LTF symbols and guard intervals in the first C-OFDMA PPDU may be identical to the duration of the EHT-LTF symbols and guard intervals in the second C-OFDMA PPDU. In some implementations, where EHT-LTF has a symbol duration that is different than a symbol duration used in the data field (such as where 1× or 2×EHT-LTF is used), the EHT-LTF symbol duration and the number of EHT-LTF symbols in the first C-OFDMA PPDU also may be the same as the EHT-LTF symbol duration and the number of EHT-LTF symbols in the second C-OFDMA PPDU. In some implementations, the number of EHT-SIG symbols, the number of EHT-LTF symbols, the LTF symbol duration, and the guard interval duration may be pre-negotiated by the APs belonging to the multi-AP group.

Figure 16:
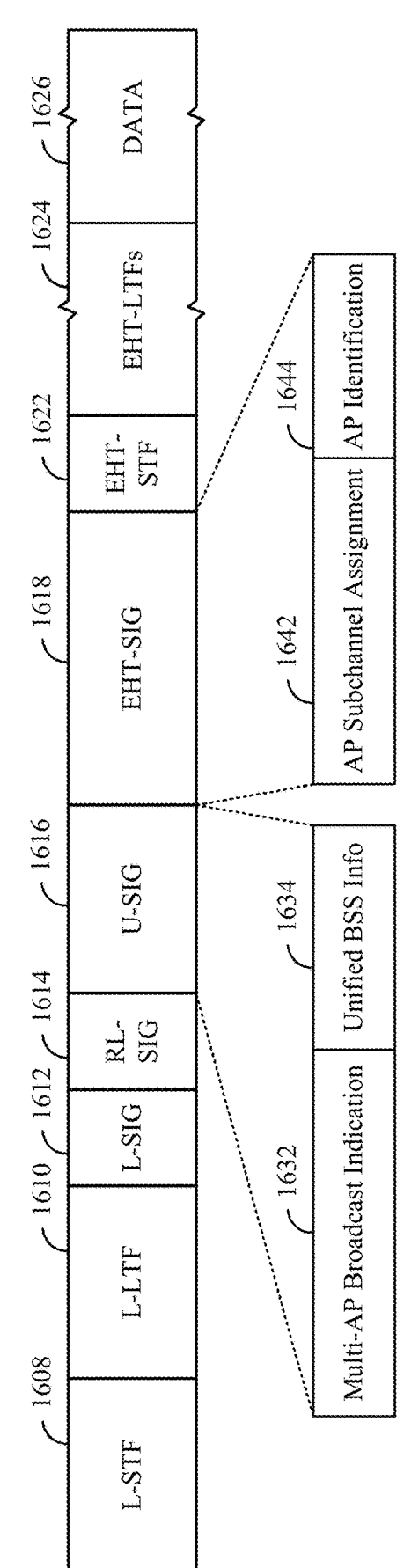
FIG. 16 shows an example multi-AP broadcast frame according to some implementations.

FIG. 16 shows an example multi-AP broadcast frame 1600 according to some implementations. The multi-AP broadcast frame 1600 may be an example implementation of the PPDU 1000 of FIG. 10. More specifically, the multi-AP broadcast frame 1600 may be a MU PPDU such as the MU PPDU 1120 of FIG. 11C. The multi-AP broadcast frame 1600 includes an L-STF 1608, an L-LTF 1610, an L-SIG 1612, an RL-SIG 1614, an EHT-STF 1622, EHT-LTFs 1624, and a DATA field 1626 which may correspond to the L-STF 1008, L-LTF 1010, L-SIG 1012, RL-SIG 1014, EHT-STF 1022, EHT-LTFs 1024, and DATA field 1026, respectively, of PPDU 1000. In some implementations, each of the fields 1608-1626 of the multi-AP broadcast frame 1600 may be duplicated or repeated on every 20 MHz subchannel. In some other implementations, U-SIG 1616 and EHT-SIG 1618 may not be duplicated every 20 MHz subchannel. For example, EHT-SIG may be implemented using a content channel structure.

The multi-AP broadcast frame 1600 may be used to identify a multi-AP group. For example, the multi-AP broadcast frame 1600 may be transmitted or broadcast by each AP belonging to the multi-AP group. In some implementations, the same content may be included in the multi-AP broadcast frame 1600 transmitted by each AP of the same multi-AP group. U-SIG 1616 may include a multi-AP broadcast indication 1632 to indicate that the PPDU is a multi-AP broadcast frame 1600. In some implementations, the multi-AP broadcast indication 1632 may be provided as a (1-bit) multi-AP broadcast packet indication in U-SIG 1616. In some other implementations, the multi-AP broadcast indication 1632 may correspond to a value in the EHT-SIG compression field of U-SIG 1616. In some implementations, U-SIG 1616 may further include unified BSS information (such as a group BS SID or BSS color) that can be used to collectively identify the multi-AP group.

The multi-AP broadcast frame 1600 also may be used for C-OFDMA pre-setup. In some implementations, the multi-AP broadcast frame 1600 may indicate which 20 MHz subchannels are occupied by each AP in the multi-AP group. For example, EHT-SIG 1618 may include an AP subchannel assignment 1642 and AP identification information 1644. In some implementations, the RU allocation information in the common field of EHT-SIG 1618 may be repurposed for the subchannel allocation assignment 1642. In other words, the common field may include the subchannel allocation assignment 1642 in lieu of RU allocation information. In some implementations, the user fields in the user specific field of EHT-SIG 1618 may be repurposed for the AP identification information 1644 (such as AP ID or BSS color). In other words, the user specific field may include the AP identification information 1644 in lieu of STA identification information (such as STA IDs).

FIG. 17A shows a flowchart illustrating an example process 1700 for wireless communication that supports PHY preamble designs for special packet types according to some implementations. In some implementations, the process 1700 may be performed by a wireless communication device operating as or within a STA such as one of the STAs 104 or 904 of FIGS. 1 and 9B, respectively. In some other implementations, the process 1700 may be performed by a wireless communication device operating as or within an AP such as one of the APs 102 or 902 of FIGS. 1 and 9A, respectively.

In some implementations, the process 1700 begins in block 1702 by receiving a packet including a physical layer preamble that includes a first portion and a second portion following the first portion, the first portion including an L-SIG, the second portion including an RL-SIG that immediately follows L-SIG and a U-SIG that immediately follows RL-SIG and carries information for interpreting one or more subsequent fields of the second portion. In some implementations, the one or more subsequent fields may include a non-legacy signal field following U-SIG, where the non-legacy signal field includes a common field and a user specific field consisting of one or more user fields. In block 1704, the process 1700 proceeds with determining a bandwidth of the packet based on the information carried in U-SIG. In block 1706, the process 1700 proceeds with receiving the packet based on the determined bandwidth.

FIG. 17B shows a flowchart illustrating an example process 1710 for wireless communication that supports PHY preamble designs for special packet types according to some implementations. In some implementations, the process 1710 may be performed by a wireless communication device operating as or within a STA such as one of the STAs 104 or 904 of FIGS. 1 and 9B, respectively. In some other implementations, the process 1710 may be performed by a wireless communication device operating as or within an AP such as one of the APs 102 or 902 of FIGS. 1 and 9A, respectively.

In some implementations, the process 1710 may begin, in block 1712, after the reception of the packet in block 1702 of the process 1700. In block 1712, the process 1710 begins by determining a value of a compression field of U-SIG that is associated with the non-legacy signal field. In block 1714, the process 1714 proceeds with determining a PPDU format of the packet based on the value of the compression field.

FIG. 18A shows a flowchart illustrating an example process 1800 for wireless communication that supports PHY preamble designs for special packet types according to some implementations. In some implementations, the process 1800 may be performed by a wireless communication device operating as or within a STA such as one of the STAs 104 or 904 of FIGS. 1 and 9B, respectively. In some other implementations, the process 1800 may be performed by a wireless communication device operating as or within an AP such as one of the APs 102 or 902 of FIGS. 1 and 9A, respectively.

In some implementations, the process 1800 begins in block 1802 by receiving, via a wireless channel, a packet including a physical layer preamble that includes a first portion and a second portion following the first portion, the first portion including an L-SIG, the second portion including an RL-SIG that immediately follows L-SIG and a U-SIG that immediately follows RL-SIG and carries information for interpreting one or more subsequent fields of the second portion. In some implementations, the one or more subsequent fields may include a non-legacy signal field including a common field and a user specific field consisting of one or more user fields, where the common field including RU allocation information for a single user. In block 1804, the process 1800 proceeds with determining a PPDU format of the packet based on the information carried in U-SIG. In block 1806, the process 1800 proceeds with determining one or more punctured subchannels of the wireless channel based on the PPDU format of the packet. In block 1808, the process 1800 proceeds with receiving the packet based on the determined punctured subchannels.

FIG. 18B shows a flowchart illustrating an example process 1810 for wireless communication that supports PHY preamble designs for special packet types according to some implementations. In some implementations, the process 1810 may be performed by a wireless communication device operating as or within a STA such as one of the STAs 104 or 904 of FIGS. 1 and 9B, respectively. In some other implementations, the process 1810 may be performed by a wireless communication device operating as or within an AP such as one of the APs 102 or 902 of FIGS. 1 and 9A, respectively.

In some implementations, the process 1810 may begin, in block 1812, after the reception of the packet in block 1802 of the process 1800. In block 1812, the process 1810 begins by determining a value of a compression field of U-SIG that is associated with the non-legacy signal field. In block 1814, the process 1810 proceeds with determining that the wireless channel is punctured based on the value of the compression field.

FIG. 18C shows a flowchart illustrating an example process 1820 for wireless communication that supports PHY preamble designs for special packet types according to some implementations. In some implementations, the process 1820 may be performed by a wireless communication device operating as or within a STA such as one of the STAs 104 or 904 of FIGS. 1 and 9B, respectively. In some other implementations, the process 1820 may be performed by a wireless communication device operating as or within an AP such as one of the APs 102 or 902 of FIGS. 1 and 9A, respectively.

In some implementations, the process 1820 may begin, in block 1822, after the reception of the packet in block 1802 of the process 1800. In block 1822, the process 1820 begins by Determining a value of an SU preamble puncturing field of U-SIG. In block 1824, the process 1820 proceeds with determining that the wireless channel is punctured based on the value of the SU preamble puncturing field.

FIG. 19A shows a flowchart illustrating an example process 1900 for wireless communication that supports PHY preamble designs for special packet types according to some implementations. In some implementations, the process 1900 may be performed by a wireless communication device operating as or within a STA such as one of the STAs 104 or 904 of FIGS. 1 and 9B, respectively. In some other implementations, the process 1900 may be performed by a wireless communication device operating as or within an AP such as one of the APs 102 or 902 of FIGS. 1 and 9A, respectively.

In some implementations, the process 1900 begins in block 1902 by receiving, via a wireless channel, a packet including a physical layer preamble that includes a first portion and a second portion following the first portion, the first portion including an L-SIG, the second portion including an RL-SIG that immediately follows L-SIG and a U-SIG that immediately follows RL-SIG and carries information for interpreting one or more subsequent fields of the second portion. In block 1904, the process 1900 proceeds with identifying a PPDU format of the packet based on the information carried in U-SIG, the PPDU format being based on an MU PPDU format. In block 1906, the process 1900 proceeds with receiving the packet based on the identified PPDU format.

FIG. 19B shows a flowchart illustrating an example process 1910 for wireless communication that supports PHY preamble designs for special packet types according to some implementations. In some implementations, the process 1910 may be performed by a wireless communication device operating as or within a STA such as one of the STAs 104 or 904 of FIGS. 1 and 9B, respectively. In some other implementations, the process 1910 may be performed by a wireless communication device operating as or within an AP such as one of the APs 102 or 902 of FIGS. 1 and 9A, respectively.

In some implementations, the process 1910 may begin, in block 1912, after the reception of the packet in block 1902 of the process 1900. In block 1912, the process 1910 begins by determining a value of a compression field of U-SIG that is associated with the non-legacy signal field. In block 1914, the process 1910 proceeds with determining, based on the value of the compression field, whether the PPDU format is a first compression mode of the MU PPDU format, a second compression mode of the MU PPDU format, or the MU PPDU format without compression.

Figure 20:
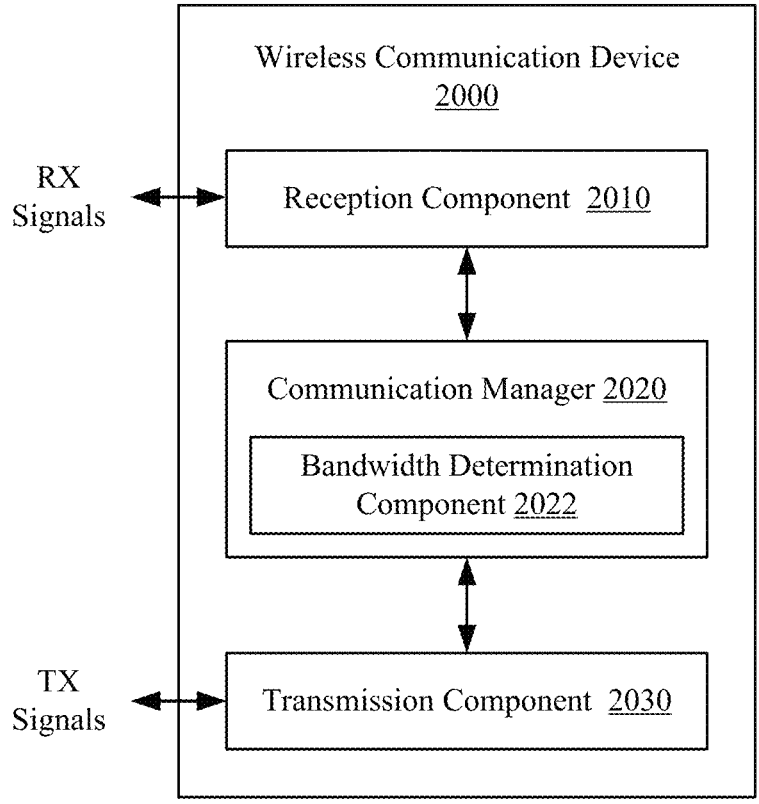
FIG. 20 shows a block diagram of an example wireless communication device according to some implementations.

FIG. 20 shows a block diagram of an example wireless communication device 2000 according to some implementations. In some implementations, the wireless communication device 2000 is configured to perform any of the processes 1700 or 1710 described above with reference to FIGS. 17A and 17B, respectively. In some implementations, the wireless communication device 2000 can be an example implementation of the wireless communication device 800 described above with reference to FIG. 8. For example, the wireless communication device 2000 can be a chip, SoC, chipset, package or device that includes at least one processor and at least one modem (for example, a Wi-Fi (IEEE 802.11) modem or a cellular modem).

The wireless communication device 2000 includes a reception component 2010, a communication manager 2020, and a transmission component 2030. The communication manager 2020 further includes a bandwidth determination component 2022. Portions of the bandwidth determination component 2022 may be implemented at least in part in hardware or firmware. In some implementations, the bandwidth determination component 2022 may be implemented at least in part as software stored in a memory (such as the memory 808). For example, portions of the bandwidth determination component 2022 can be implemented as non-transitory instructions (or "code") executable by a processor (such as the processor 806) to perform the functions or operations of the respective component.

The reception component 2010 is configured to receive RX signals from other wireless communication devices. In some implementations, the RX signals may include a packet including a physical layer preamble that includes a first portion and a second portion following the first portion, where the first portion includes an L-SIG, and where the second portion includes an RL-SIG that immediately follows L-SIG and a U-SIG that immediately follows RL-SIG and carries information for interpreting one or more subsequent fields of the second portion. In some implementations, the reception component 2010 may receive the packed based on a bandwidth of the PPDU. The communication manager 2020 is configured to control or manage communications with other wireless communication devices. In some implementations, the bandwidth determination component 2022 may determine the bandwidth of the packet based on the information carried in U-SIG. The transmission component 2030 is configured to transmit TX signals to other wireless communication devices.

Figure 21:
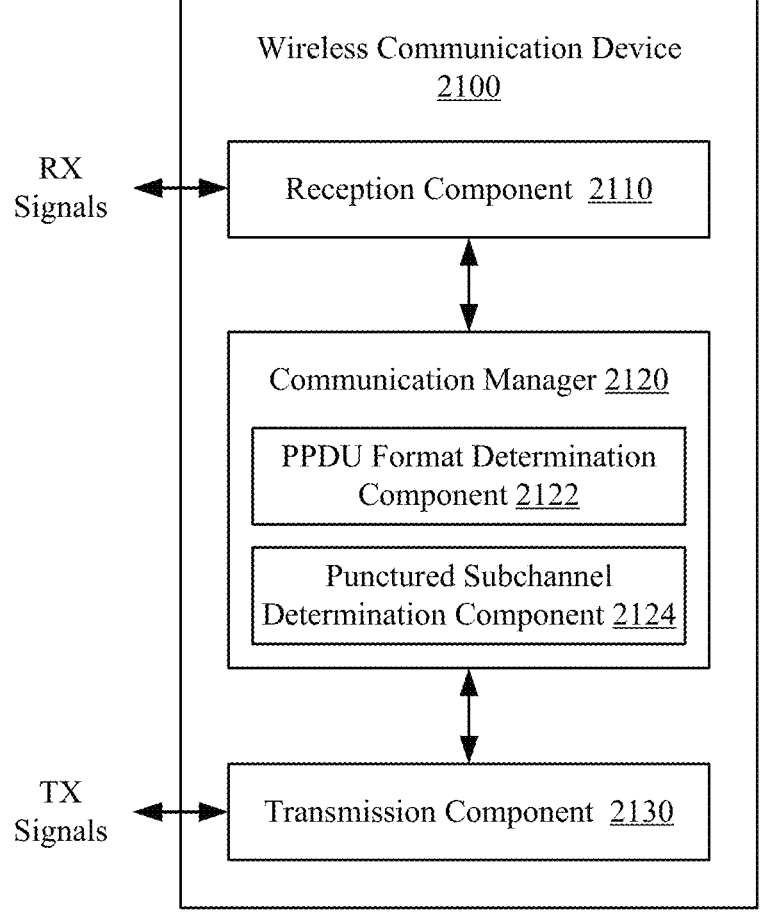
FIG. 21 shows a block diagram of an example wireless communication device according to some implementations.

FIG. 21 shows a block diagram of an example wireless communication device 2100 according to some implementations. In some implementations, the wireless communication device 2100 is configured to perform any of the processes 1800-1820 described above with reference to FIGS. 18A-18C, respectively. In some implementations, the wireless communication device 2100 can be an example implementation of the wireless communication device 800 described above with reference to FIG. 8. For example, the wireless communication device 2100 can be a chip, SoC, chipset, package or device that includes at least one processor and at least one modem (for example, a Wi-Fi (IEEE 802.11) modem or a cellular modem).

The wireless communication device 2100 includes a reception component 2110, a communication manager 2120, and a transmission component 2130. The communication manager 2120 further includes a PPDU format determination component 2122 and a punctured subchannel determination component 2124. Portions of one or more of the components 2122 and 2124 may be implemented at least in part in hardware or firmware. In some implementations, at least some of the components 2122 or 2124 are implemented at least in part as software stored in a memory (such as the memory 808). For example, portions of one or more of the components 2122 and 2124 can be implemented as non-transitory instructions (or "code") executable by a processor (such as the processor 806) to perform the functions or operations of the respective component.

The reception component 2110 is configured to receive RX signals, over a wireless channel, from other wireless communication devices. In some implementations, the RX signals may include a packet including a physical layer preamble that includes a first portion and a second portion following the first portion, where the first portion includes an L-SIG, and where the second portion includes an RL-SIG that immediately follows L-SIG and a U-SIG that immediately follows RL-SIG and carries information for interpreting one or more subsequent fields of the second portion. In some implementations, the reception component 2010 may receive the packed based on one or more punctured subchannels of the wireless channel. The communication manager 2120 is configured to control or manage communications with other wireless communication devices. In some implementations, the PPDU format determination component 2122 may determine a PPDU format of the packet based on the information carried in U-SIG, and the punctured subchannel determination component 2124 may determine the one or more punctured subchannels of the wireless channel based on the PPDU format of the packet. The transmission component 2130 is configured to transmit TX signals to other wireless communication devices.

Figure 22:
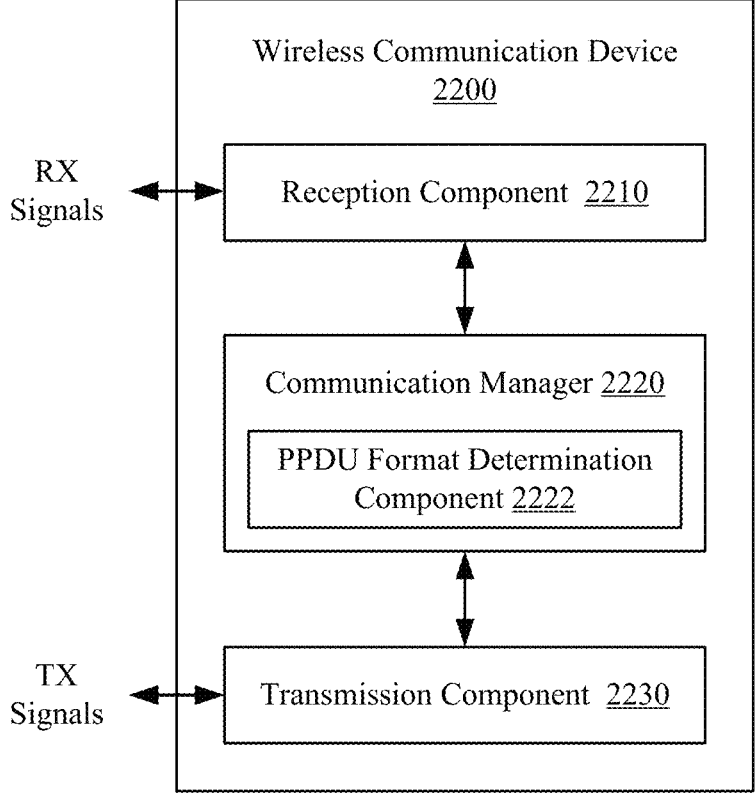
FIG. 22 shows a block diagram of an example wireless communication device according to some implementations.

FIG. 22 shows a block diagram of an example wireless communication device 2200 according to some implementations. In some implementations, the wireless communication device 2200 is configured to perform any of the processes 1900 or 1910 described above with reference to FIGS. 19A and 19B, respectively. In some implementations, the wireless communication device 2200 can be an example implementation of the wireless communication device 800 described above with reference to FIG. 8. For example, the wireless communication device 2200 can be a chip, SoC, chipset, package or device that includes at least one processor and at least one modem (for example, a Wi-Fi (IEEE 802.11) modem or a cellular modem).

The wireless communication device 2200 includes a reception component 2210, a communication manager 2220, and a transmission component 2230. The communication manager 2220 further includes a PPDU format determination component 2222. Portions of the PPDU format determination component 2222 may be implemented at least in part in hardware or firmware. In some implementations, the PPDU format determination component 2222 may be implemented at least in part as software stored in a memory (such as the memory 808). For example, portions of the PPDU format determination component 2222 can be implemented as non-transitory instructions (or "code") executable by a processor (such as the processor 806) to perform the functions or operations of the respective component.

The reception component 2210 is configured to receive RX signals from other wireless communication devices. In some implementations, the RX signals may include a packet including a physical layer preamble that includes a first portion and a second portion following the first portion, where the first portion includes an L-SIG, and where the second portion includes an RL-SIG that immediately follows L-SIG and a U-SIG that immediately follows RL-SIG and carries information for interpreting one or more subsequent fields of the second portion. In some implementations, the reception component 2210 may receive the packed based on a PPDU format of the packet. The communication manager 2220 is configured to control or manage communications with other wireless communication devices. In some implementations, the PPDU format determination component 2222 may identify a PPDU format of the packet based on the information carried in U-SIG, where the PPDU format is based on an MU PPDU format. The transmission component 2230 is configured to transmit TX signals to other wireless communication devices.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of wireless communication by a first wireless access point (AP), comprising:

generating a first portion of a first physical layer protocol data unit (PPDU) in accordance with a second PPDU to be transmitted by a second wireless AP, the first portion including at least a legacy signal field (L-SIG), a repeat of the L-SIG (RL-SIG) that immediately follows the L-SIG and a universal signal field (U-SIG) that immediately follows the RL-SIG and carries information for interpreting one or more subsequent fields of a second portion, the U-SIG including BSS color information to identify a multi-AP group, the second portion of the first PPDU including at least a short training field, a long training field, and a data field; and transmitting the first PPDU to a first receiving device, concurrently with transmission of the second PPDU by the second wireless AP, wherein the first and second PPDUs are transmitted as multi-AP transmissions coordinated between at least the first and the second APs, and wherein a beamformed portion of the first PPDU does not include the first portion of the first PPDU.

2. The method of claim 1, wherein the first and second PPDUs are transmitted by the first and second wireless APs, the first and second wireless APs belonging to first and second basic service sets (BSSs), respectively.

3. The method of claim 2, wherein the first and second PPDUs are transmitted as coordinated beamforming (CoBF) transmissions and wherein the first receiving device belongs to the first BSS and the second PPDU is transmitted to a second receiving device belonging to the second BSS, wherein at least a portion of each of the first and second PPDUs is transmitted using beamforming, a beamformed portion of the first PPDU being protected from overlapping BSS (OBSS) interference through nulling of the interference by a beamformed portion of the second PPDU.

4. The method of claim 2, wherein the information in the U-SIG is common to the first and second BSSs, and wherein the information common to all BSSs includes the BSS color information.

5. The method of claim 4, further comprising:

transmitting a setup PPDU to the first receiving device prior to the transmission of the first PPDU, the setup PPDU carrying user specific information for the first receiving device.

6. The method of claim 3, wherein the first PPDU functions as a single BSS PPDU without OBSS interference in the beamformed portion of the first PPDU.

7. The method of claim 3, wherein beamforming is only performed on the second portion of the first PPDU, and wherein the first portion of the first PPDU is transmitted omnidirectionally.

8. The method of claim 1, wherein the transmission of the first PPDU is synchronized in time and frequency with the transmission of the second PPDU.

9. The method of claim 1, wherein the first PPDU and the second PPDU have a same LTF symbol duration, and a same guard interval duration.

10. The method of claim 1, further comprising:

transmitting a trigger frame, prior to the transmission of the first PPDU, to indicate to other wireless communication devices not to interfere with the transmission of the first PPDU, wherein the trigger frame comprises a request to send (RTS) frame or a clear to send (CTS)-to-self frame.

11. The method of claim 1, wherein the first portion of the first PPDU is identical to a first portion of the second PPDU.

12. The method of claim 1, wherein the first and second PPDUs are transmitted as joint transmissions by the first and second wireless communication devices, and wherein the second PPDU is also transmitted to the first receiving device.

13. The method of claim 12, further comprising:

transmitting synchronization information to the second wireless communication device during one or more gaps in the transmission of the first PPDU, wherein the one or more gaps are periodically repeated over a duration of the transmission of the first PPDU.

14. The method of claim 1, wherein the first wireless AP comprises a primary AP and the second wireless AP comprises a secondary AP.

15. The method of claim 1, wherein at least a portion of each of the first and second PPDUs is transmitted using beamforming and wherein the beamformed portion of the first PPDU includes the first portion of the first PPDU.

16. The method of claim 1, wherein the first and second PPDUs are transmitted as coordinated spatial reuse (CoSR) transmissions.

17. An apparatus for wireless communication by a first wireless access point (AP), comprising:

a processing system that includes one or more processors and one or more memories coupled with the one or more processors, the processing system configured to cause the apparatus to:

generate a first portion of a first physical layer protocol data unit (PPDU) in accordance with a second PPDU to be transmitted by a second wireless AP, the first portion including at least a legacy signal field (L-SIG), a repeat of the L-SIG (RL-SIG) that immediately follows the L-SIG and a universal signal field (U-SIG) that immediately follows the RL-SIG and carries information for interpreting one or more subsequent fields of a second portion, the U-SIG including BSS color information to identify a multi-AP group, the second portion of the first PPDU including at least a short training field, a long training field, and a data field; and transmit the first PPDU, to a first receiving device, concurrently with transmission of the second PPDU by the second wireless AP, wherein the first and second PPDUs are transmitted as multi-AP transmissions coordinated between at least the first and the second APs, and wherein a beamformed portion of the first PPDU does not include the first portion of the first PPDU.

18. The apparatus of claim 17, wherein the first and second PPDUs are transmitted as coordinated beamforming (CoBF) transmissions and wherein the first receiving device belongs to the first BSS and the second PPDU is transmitted to a second receiving device belonging to the second BSS, wherein at least a portion of each of the first and second PPDUs is transmitted using beamforming, a beamformed portion of the first PPDU being protected from overlapping BSS (OBSS) interference through nulling of the interference by a beamformed portion of the second PPDU.

19. The apparatus of claim 17, wherein the first and second PPDUs are transmitted as joint transmissions by the first and second wireless APs, and wherein the second PPDU is also transmitted to the first receiving device.

* * * * *